(12) United States Patent
Hendry

(10) Patent No.: US 12,432,384 B2
(45) Date of Patent: Sep. 30, 2025

(54) METHOD AND DEVICE FOR GENERATING/RECEIVING MEDIA FILE INCLUDING NAL UNIT INFORMATION, AND METHOD FOR TRANSMITTING MEDIA FILE

(71) Applicant: LG ELECTRONICS INC., Seoul (KR)

(72) Inventor: Hendry Hendry, Seoul (KR)

(73) Assignee: LG ELECTRONICS INC., Seoul (KR)

(*) Notice: Subject to any disclaimer, the term of this patent is extended or adjusted under 35 U.S.C. 154(b) by 90 days.

(21) Appl. No.: 18/267,717

(22) PCT Filed: Dec. 17, 2021

(86) PCT No.: PCT/KR2021/019266
§ 371 (c)(1),
(2) Date: Jun. 15, 2023

(87) PCT Pub. No.: WO2022/131845
PCT Pub. Date: Jun. 23, 2022

(65) Prior Publication Data
US 2023/0412846 A1 Dec. 21, 2023

Related U.S. Application Data

(60) Provisional application No. 63/127,090, filed on Dec. 17, 2020.

(51) Int. Cl.
*H04N 19/70* (2014.01)
*H04N 19/169* (2014.01)
(52) U.S. Cl.
CPC ........... *H04N 19/70* (2014.11); *H04N 19/188* (2014.11)

(58) Field of Classification Search
CPC .. H04N 19/70; H04N 19/188; H04N 21/2662; H04N 21/6336; H04N 21/85406; H04N 21/8451
See application file for complete search history.

(56) References Cited

U.S. PATENT DOCUMENTS

2014/0098868 A1* 4/2014 Wang .................... H04N 19/70
375/240.13

FOREIGN PATENT DOCUMENTS

KR 10-0908062 B1 9/2007
KR 10-1719935 B1 9/2013
(Continued)

OTHER PUBLICATIONS

ISO/IEC ("Potential improvements on Carriage of VVC and EVC in ISOBMFF", 132. MPEG Meeting; Oct. 12, 2020-Oct. 16, 2020; ONLINE; (Motion Picture Expert Geoup or ISO/IEC JTC1/SC29/WG11), No. n19715; Nov. 19, 2020, XP030291526) (Year: 2020).*

(Continued)

*Primary Examiner* — Maria E Vazquez Colon
(74) *Attorney, Agent, or Firm* — Bryan Cave Leighton Paisner LLP

(57) ABSTRACT

Disclosed herein are a method and apparatus for generating/receiving a media file including NAL unit information and a method of transmitting a media file. A media file receiving method may comprise obtaining network abstraction layer (NAL) unit information of video data from a decoder configuration record in a media file and processing the video data based on the NAL unit information. The NAL unit information may comprise first information specifying a number of NAL units having a NAL unit type indicated in the decoder configuration record, for a stream to which the decoder configuration record is applied, and based on the indicated NAL unit type being a predetermined non-video (Continued)

coding layer (non-VCL) NAL unit type, obtaining of the first information may be skipped.

11 Claims, 11 Drawing Sheets

(56) References Cited

FOREIGN PATENT DOCUMENTS

| KR | 10-1812615 B1 | 9/2013 |
|---|---|---|
| KR | 10-2018-0019557 A | 2/2018 |

OTHER PUBLICATIONS

ITU-T Recommendations, ITU-T H.266, Telecommunication Standardization Sector of ITU, (Aug. 2020), Series H: Audiovisual and Multimedia Systems, Infrastructure of audiovisual services—Coding of moving video, Versatile video coding, Recommendation, 518 pages.

Hannuksela et al. "AHG9: On target OLS and sublayers for decoding," ITU-T SG 16 WP 3 and ISO/IEC JTC 1/SC 29/WG 11, JVET-S0163, 7 pages, Jul. 2020.

Information technology—Coding of audio-visual objects—Part 15: Carriage of network abstraction layer (NAL) unit structured video in the ISO base media file format—Amendment 2: Carriage of VVA and EVC in ISOBMFF, ISO/IEC JTC 1/SC 29/WG 11, 65 pages, Nov. 2020.

Deshpande "On Picture Timing Information Signalling," ITU-T SG 16 WP 3 and ISO/IEC JTC 1/SC 29/WG 11, JVET-P0183-v1, 11 pages, Oct. 2019.

Hendry et al. "[8.1] On the presence of DCI, OPI, and VPS NAL unit in sample entry," ISO/IEC JTC 1/SC 29/WG 3 M56106, 2 pages, Jan. 2021.

* cited by examiner

FIG. 9

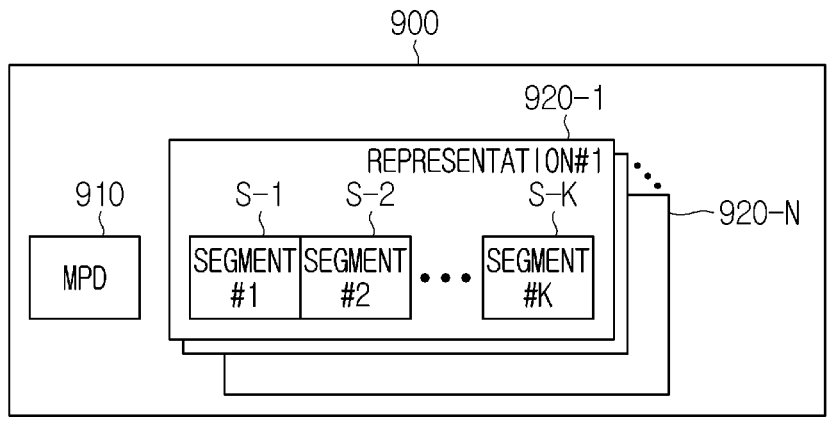

FIG. 10

```
aligned(8) class VvcPTLRecord(num_sublayers) {
    bit(2) reserved = 0;
    unsigned int(6) num_bytes_constraint_info;
    unsigned int(7) general_profile_idc;
    unsigned int(1) general_tier_flag;
    unsigned int(8) general_level_idc;
    unsigned int(1) ptl_frame_only_constraint_flag;
    unsigned int(1) ptl_multilayer_enabled_flag;
    unsigned int(8*num_bytes_constraint_info - 2) general_constraint_info;
    for (i=num_sublayers - 2; i >= 0; i--)
        unsigned int(1) ptl_sublayer_level_present_flag[i];
    for (j=num_sublayers; j<=8 && num_sublayers > 1; j++)
        bit(1) ptl_reserved_zero_bit = 0;
    for (i=num_sublayers-2; i >= 0; i--)
        if (ptl_sublayer_level_present[i])
            unsigned int(8) sublayer_level_idc[i];
    unsigned int(8) num_sub_profiles;
    for (j=0; j < num_sub_profiles; j++)
        unsigned int(32) general_sub_profile_idc[j];
}
```

FIG. 11

```
aligned(8) class VvcDecoderConfigurationRecord {
    unsigned int(8) configurationVersion = 1;
    bit(5) reserved = '11111'b;
    unsigned int(2) lengthSizeMinusOne;
    unsigned int(1) ptl_present_flag;
    if (ptl_present_flag) {
        unsigned int(16) output_layer_set_idx;
        unsigned int(16) avgFrameRate;
        unsigned int(2) constantFrameRate;
        unsigned int(3) numTemporalLayers;
        unsigned int(2) chroma_format_idc;
        unsigned int(3) bit_depth_minus8;
        bit(6) reserved = '111111'b;
        unsigned_int(16) picture_width;
        unsigned_int(16) picture_height;
        VvcPTLRecord(numTemporalLayers) track_ptl;
    }
    unsigned int(8) numOfArrays;
    for (j=0; j < numOfArrays; j++) {
        unsigned int(1) array_completeness;
        bit(2) reserved = 0;
        unsigned int(5) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
}
```

FIG. 12

```
aligned(8) class VvcDecoderConfigurationRecord {
    unsigned int(8) configurationVersion = 1;
    bit(5) reserved = '11111'b;
    unsigned int(2) lengthSizeMinusOne;
    unsigned int(1) ptl_present_flag;
    if (ptl_present_flag) {
        unsigned int(16) output_layer_set_idx;
        unsigned int(16) avgFrameRate;
        unsigned int(2) constantFrameRate;
        unsigned int(3) numTemporalLayers;
        unsigned int(2) chroma_format_idc;
        unsigned int(3) bit_depth_minus8;
        bit(6) reserved = '111111'b;
        unsigned_int(16) picture_width;
        unsigned_int(16) picture_height;
        VvcPTLRecord(numTemporalLayers) track_ptl;
    }
    unsigned int(8) numOfArrays;
    for (j=0; j < numOfArrays; j++) {
        unsigned int(1) array_completeness;
        bit(2) reserved = 0;
        unsigned int(5) NAL_unit_type;
        if (NAL_unit_type != DCI_NUT && NAL_unit_type != OPI_NUT &&
                !(NAL_unit_type == VPS_NUT_NUT && array_completeness))
            unsigned int(16) numNalus;
        for (i=0; i< numNalus; i++) {
            unsigned int(16) nalUnitLength;
            bit(8*nalUnitLength) nalUnit;
        }
    }
}
```

METHOD AND DEVICE FOR GENERATING/RECEIVING MEDIA FILE INCLUDING NAL UNIT INFORMATION, AND METHOD FOR TRANSMITTING MEDIA FILE

CROSS-REFERENCE TO RELATED APPLICATIONS

This application is the National Stage filing under 35 U.S.C. of International Application No. PCT/KR2021/019266, filed on Dec. 17, 2021, which claims the benefit of U.S. Provisional Application 63/127,090, filed Dec. 17, 2020, the contents of which are all hereby incorporated by reference herein in their entirety.

TECHNICAL FIELD

The present disclosure relates to a method and apparatus for generating/receiving a media file including NAL unit information, and more particularly, to a method and apparatus for generating/receiving a media file capable of ensuring correct sample reconstruction by preventing omission of essential layer information, and a method of transmitting a media file generated by the method/apparatus for generating the media file of the present disclosure.

BACKGROUND

Recently, the demand for high-resolution and high-quality images such as 360-degree images is increasing. As the resolution or quality of an image increases, a file capacity or a frame rate increases, which inevitably increases storage cost and transmission cost. In addition, as mobile devices such as smartphones and tablet PCs become popular, the demand for multimedia services based on communication networks is rapidly increasing. However, there is a problem that hardware and network resources for multimedia services are limited.

Accordingly, there is a need for high-efficiency image compression and file processing technologies for more effectively storing and transmitting image data.

SUMMARY

An object of the present disclosure is to provide a method and apparatus for generating/receiving a media file that effectively encodes/decodes NAL unit information.

In addition, an object of the present disclosure is to provide a method and apparatus for generating/receiving a media file that does not include a specific type of NAL unit number information.

In addition, an object of the present disclosure is to provide a method and apparatus for generating/receiving a media file that limits a specific type of NAL unit number information value.

An object of the present disclosure is to provide a method of transmitting a media file generated by a media file generating method or apparatus according to the present disclosure.

An object of the present disclosure is to provide a recoding medium storing a media file generated by a media file generating method or apparatus according to the present disclosure.

An object of the present disclosure is to provide a recording medium storing a media file received by a media file receiving apparatus according to the present disclosure and used to reconstruct an image.

The technical problems solved by the present disclosure are not limited to the above technical problems and other technical problems which are not described herein will become apparent to those skilled in the art from the following description.

A media file receiving method according to an aspect of the present disclosure may comprise obtaining network abstraction layer (NAL) unit information of video data from a decoder configuration record in a media file and processing the video data based on the NAL unit information. The NAL unit information may comprise first information specifying a number of NAL units having a NAL unit type indicated in the decoder configuration record, for a stream to which the decoder configuration record is applied, and based on the indicated NAL unit type being a predetermined non-video coding layer (non-VCL) NAL unit type, obtaining of the first information may be skipped.

A media file receiving apparatus according to another aspect of the present disclosure may comprise a memory and at least one processor. The at least one processor may obtain network abstraction layer (NAL) unit information of video data from a decoder configuration record in a media file and process the video data based on the NAL unit information. The NAL unit information may comprise first information specifying a number of NAL units having a NAL unit type indicated in the decoder configuration record, for a stream to which the decoder configuration record is applied, and based on the indicated NAL unit type being a predetermined non-video coding layer (non-VCL) NAL unit type, obtaining of the first information may be skipped.

A media file generating method according to another aspect of the present disclosure may comprise encoding video data, generating a decoder configuration record including network abstraction layer (NAL) unit information of the encoded video data, and generating a media file based on the encoded video data and the decoder configuration record. The NAL unit information may comprise first information specifying a number of NAL units having a NAL unit type indicated in the decoder configuration record, for a stream to which the decoder configuration record is applied, and based on the indicated NAL unit type being a predetermined non-video coding layer (non-VCL) NAL unit type, the first information may not be included in the decoder configuration record.

A media file generating apparatus according to another aspect of the present disclosure may comprise a memory and at least one processor. The at least one processor may encode video data, generate a decoder configuration record including network abstraction layer (NAL) unit information of the encoded video data, and generate a media file based on the encoded video data and the decoder configuration record. The NAL unit information may comprise first information specifying a number of NAL units having a NAL unit type indicated in the decoder configuration record, for a stream to which the decoder configuration record is applied, and based on the indicated NAL unit type being a predetermined non-video coding layer (non-VCL) NAL unit type, the first information may not be included in the decoder configuration record.

In a media file transmitting method according to another aspect of the present disclosure, a media file generated by the media file generating method or apparatus of the present disclosure may be transmitted.

A computer-readable recording medium according to another aspect of the present disclosure may store a media file generated by the media file generating method or apparatus of the present disclosure.

The features briefly summarized above with respect to the present disclosure are merely exemplary aspects of the detailed description below of the present disclosure, and do not limit the scope of the present disclosure.

According to the present disclosure, it is possible to provide a method and apparatus for generating/receiving a media file that effectively encodes/decodes NAL unit information.

According to the present disclosure, it is possible to provide a method and apparatus for generating/receiving a media file that does not include a specific type of NAL unit number information.

According to the present disclosure, it is possible to provide a method and apparatus for generating/receiving a media file that limits a specific type of NAL unit number information value.

According to the present disclosure, it is possible to provide a method of transmitting a media file generated by a media file generating method or apparatus according to the present disclosure.

According to the present disclosure, it is possible to provide a recoding medium storing a media file generated by a media file generating method or apparatus according to the present disclosure.

According to the present disclosure, it is possible to provide a recording medium storing a media file received by a media file receiving apparatus according to the present disclosure and used to reconstruct an image.

It will be appreciated by persons skilled in the art that that the effects that can be achieved through the present disclosure are not limited to what has been particularly described hereinabove and other advantages of the present disclosure will be more clearly understood from the detailed description.

BRIEF DESCRIPTION OF THE DRAWINGS

FIG. 9 is a view illustrating an example of an image signal structure.

FIG. 10 is a view illustrating a syntax structure for signaling a PTL record.

FIG. 11 is a view illustrating a syntax structure for signaling a decoder configuration record.

FIG. 12 is a view illustrating an example of a syntax structure for signaling a decoder configuration record according to an embodiment of the present disclosure.

DETAILED DESCRIPTION

Figure 1:
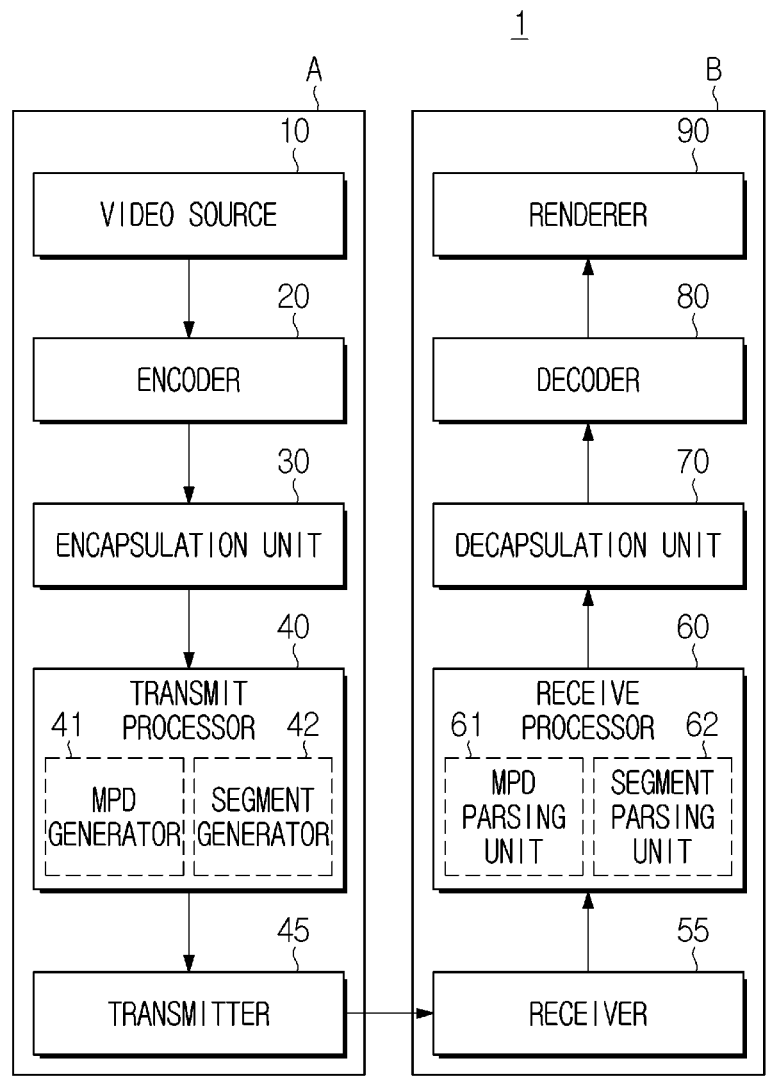
FIG. 1 is a view schematically illustrating a media file transmission/receiving system according to an embodiment of the present disclosure.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The luma component block of the current block may be expressed by including an explicit description of a luma component block such as "luma block" or "current luma block. In addition, the "chroma component block of the current block" may be expressed by including an explicit description of a chroma component block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of media file transmission/receiving system

FIG. 1 is a view schematically illustrating a media file transmission/receiving system according to an embodiment of the present disclosure.

Referring to FIG. 1, the media file transmission/receiving system 1 may include a transmitting apparatus A and a receiving apparatus B. In some embodiments, the media file transmission/receiving system 1 may support adaptive streaming based on MPEG-DASH (dynamic adaptive streaming over HTTP), thereby supporting seamless media content reproduction.

The transmitting apparatus A may include a video source 10, an encoder 20, an encapsulation unit 30, a transmit processor 40 and a transmitter 45.

The video source 10 may generate or obtain media data such as video or image. To this end, the video source 10 may include a video/image capture device and/or a video/image generating device or may be connected to an external device to receive media data.

The encoder 20 may encode media data received from the video source 10. The encoder 20 may perform a series of procedures such as prediction, transform, and quantization according to a video codec standard, for example, a Versatile Video Coding (VVC) standard, for compression and encoding efficiency. The encoder 20 may output the encoded media data in the form of a bitstream.

The encapsulation unit 30 may encapsulate the encoded media data and/or media data related metadata. For example, the encapsulation unit 30 may encapsulate the data in a file format such as ISO Base Media File Format (ISO BMFF) or Common Media Application Format (CMAF), or process the data in the form of segments. Media data (hereinafter, referred to as a 'media file') encapsulated in the form of a file may be stored in a storage unit (not shown) in some embodiments. The media file stored in the storage unit may be read by the transmit processor 40 and transmitted to the receiving apparatus B according to an on demand, non-real time (NRT) or broadband method.

The transmit processor 40 may generate an image signal by processing the media file according to an arbitrary transmitting method. The media file transmitting method may include a broadcast method and a broadband method.

According to the broadcast method, the media file may be transmitted using an MPEG Media Transport (MMT) protocol or a Real time Object delivery over Unidirectional Transport (ROUTE) protocol. The MMT protocol may be a transport protocol supporting media streaming regardless of a file format or codec in an IP-based network environment. In the case of using the MMT protocol, the media file may be processed in Media Processing Units (MPUs) based on MMT and then transmitted according to the MMT protocol. The ROUTE protocol is an extension of File Delivery over Unidirectional Transport (FLUTE), and may be a transport protocol supporting real-time transmission of media files. In the case of using the ROUTE protocol, the media file may be processed into one or more segments based on MPEG-DASH and then transmitted according to the ROUTE protocol.

According to the broadband method, the media file may be transmitted through a network using HTTP (HyperText Transfer Protocol). Information transmitted through HTTP may include signaling metadata, segment information, and/or Non-Real Time (NRT) service information.

In some embodiments, the transmit processor 40 may include an MPD generator 41 and a segment generator 42 to support adaptive media streaming The MPD generator 41 may generate a Media Presentation Description (MPD) based on the media file. The MPD is a file including detailed information on media presentation, and may be expressed in an XML format. The MPD may provide signaling metadata, such as an identifier for each segment. In this case, the receiving apparatus B may dynamically obtain segments based on the MPD.

The segment generator 42 may generate one or more segments based on the media file. The segment may include actual media data and may have a file format such as ISO BMFF. The segment may be included in the representation of an image signal, and, as described above, may be identified based on the MPD.

In addition, the transmit processor 40 may generate an image signal according to the MPEG-DASH standard based on the generated MPD and segment.

The transmitter 45 may transmit the generated image signal to the receiving apparatus B. In some embodiments, the transmitter 45 may transmit an image signal to the receiving apparatus B through an IP network according to the MMT standard or the MPEG-DASH standard. According to the MMT standard, the image signal transmitted to the receiving apparatus B may include a presentation information document (PI) including reproduction information of the media data. According to the MPEG-DASH standard, the image signal transmitted to the receiving apparatus B may include the aforementioned MPD as reproduction information of the media data. However, in some embodiments, the MPD and the segment may be individually transmitted to the receiving apparatus B. For example, a first image signal including the MPD may be generated by the transmitting apparatus A or an external server and transmitted to the receiving apparatus B, and a second image signal including the segment may be generated by the transmitting apparatus A and may be transmitted to the receiving apparatus B.

Meanwhile, although the transmit processor 40 and the transmitter 45 are illustrated as separate elements in FIG. 1, they may be integrally implemented as a single element in some embodiments. Also, the transmit processor 40 may be implemented as an external device (e.g., DASH server) separate from the transmitting apparatus A. In this case, the transmitting apparatus A may operate as a source apparatus generating a media file by encoding the media data, and the external apparatus may operate as a server apparatus generating an image signal by processing the media data according to an arbitrary transmission protocol.

Next, the receiving apparatus B may include a receiver 55, a receive processor 60, a decapsulation unit 70, a decoder 80, and a renderer 90. In some embodiments, the receiving apparatus B may be an MPEG-DASH-based client.

The receiver 55 may receive an image signal from the transmitting apparatus A. The image signal according to the MMT standard may include a PI document and a media file. In addition, the image signal according to the MPEG-DASH standard may include an MPD and a segment. In some embodiments, the MPD and the segment may be separately transmitted through different image signals.

The receive processor 60 may extract/parse a media file by processing the received image signal according to a transport protocol.

In some embodiments, the receive processor 60 may include an MPD parsing unit 61 and a segment parsing unit 62 in order to support adaptive media streaming The MPD parsing unit 61 may obtain an MPD from the received image signal, and parse the obtained MPD to generate a command required for obtaining a segment. Also, the MPD parsing unit 61 may obtain media data reproduction information, for example, color conversion information, based on the parsed MPD.

The segment parsing unit 62 may obtain a segment based on the parsed MPD and parse the obtained segment to extract the media file. In some embodiments, the media file may have a file format such as ISO BMFF or CMAF.

The decapsulation unit 70 may decapsulate the extracted media file to obtain media data and metadata related thereto. The obtained metadata may have the form of a box or track in a file format. In some embodiments, the decapsulation unit 70 may receive metadata required for decapsulation from the MPD parsing unit 61.

The decoder 80 may decode the obtained media data according to a video codec standard, for example, a VVC standard. To this end, the decoder 80 may perform a series of procedures such as inverse quantization, inverse transform, and prediction corresponding to operation of the encoder 20.

The renderer 90 may render media data such as the decoded video or image. The rendered media data may be reproduced through a display unit (not shown).

Hereinafter, a media file transmission/receiving method will be described in detail.

Figure 2:
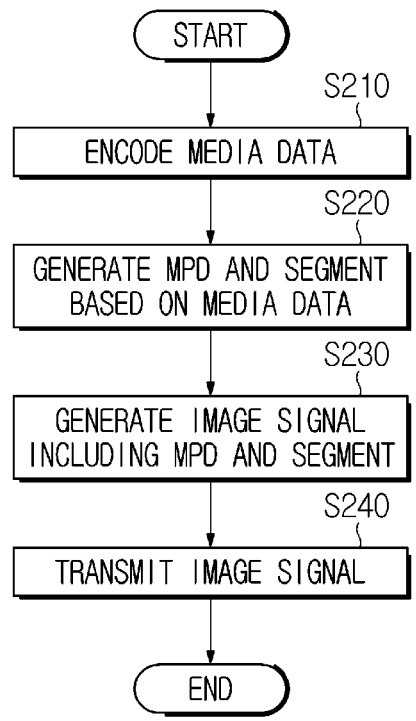
FIG. 2 is a flowchart illustrating a media file transmitting method.

FIG. 2 is a flowchart illustrating a media file transmitting method.

In one example, each step of FIG. 2 may be performed by the transmitting apparatus A of FIG. 1. Specifically, step S210 may be performed by the encoder 20 of FIG. 1. Also, steps S220 and S230 may be performed by the transmit processor 40. Also, step S240 may be performed by the transmitter 45.

Referring to FIG. 2, the transmitting apparatus may encode media data such as a video or an image (S210). The media data may be captured/generated by the transmitting apparatus or obtained from an external device (e.g., camera, video archive, etc.). Media data may be encoded in the form of a bitstream according to a video codec standard, for example, a VVC standard.

The transmitting apparatus may generate an MPD and one or more segments based on the encoded media data (S220). The MPD may include detailed information about media presentation as described above. The segment may contain actual media data. In some embodiments, the media data may be encapsulated in a file format such as ISO BMFF or CMAF and included in a segment.

The transmitting apparatus may generate an image signal including the generated MPD and segment (S230). In some embodiments, the image signal may be individually generated for each of the MPD and segment. For example, the transmitting apparatus may generate a first image signal including an MPD and generate a second image signal including a segment.

The transmitting apparatus may transmit the generated image signal to the receiving apparatus (S240). In some embodiments, the transmitting apparatus may transmit the image signal using a broadcast method. In this case, the MMT protocol or the ROUTE protocol may be used. Alternatively, the transmitting apparatus may transmit the image signal using a broadband method.

Meanwhile, although, in FIG. 2, the MPD and an image signal including the same are described as being generated and transmitted by the transmitting apparatus (steps S220 to S240), in some embodiments, the MPD and an image including the same may be generated and transmitted by an external server different from the transmitting apparatus.

Figure 3:
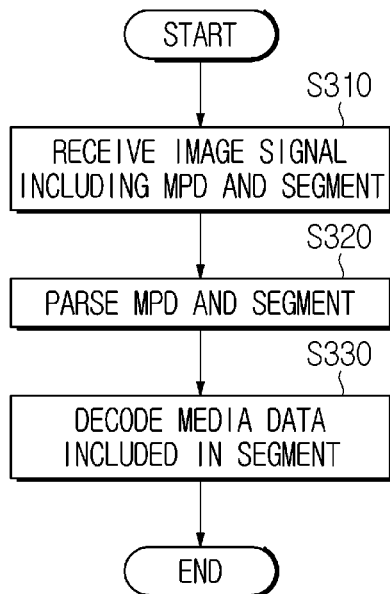
FIG. 3 is a flowchart illustrating a media file receiving method.

FIG. 3 is a flowchart illustrating a media file receiving method.

In an example, each step of FIG. 3 may be performed by the receiving apparatus B of FIG. 1. Specifically, step S310 may be performed by the receiver 55. Also, step S320 may be performed by the receive processor 60. Also, step S330 may be performed by the decoder 80.

Referring to FIG. 3, the receiving apparatus may receive an image signal from the transmitting apparatus (S310). An image signal according to the MPEG-DASH standard may include an MPD and a segment. In some embodiments, the MPD and the segment may be individually received through different image signals. For example, a first image signal including the MPD may be received from the transmitting apparatus of FIG. 1 or an external server, and a second image signal including the segment may be received from the transmitting apparatus of FIG. 1.

The receiving apparatus may extract the MPD and segment from the received image signal, and parse the extracted MPD and segment (S320). Specifically, the receiving apparatus may parse the MPD to generate a command required for obtaining a segment. Then, the receiving apparatus may obtain a segment based on the parsed MPD, and parse the obtained segment to obtain media data. In some embodiments, the receiving apparatus may perform decapsulation on media data in a file format in order to obtain the media data from the segment.

The receiving apparatus may decode the media data such as the obtained video or image (S330). The receiving apparatus may perform a series of procedures such as inverse quantization, inverse transform, and prediction in order to decode the media data. Then, the receiving apparatus may render the decoded media data and reproduce the media data through a display.

Hereinafter, an image encoding/decoding apparatus will be described in detail.

Overview of image encoding apparatus

Figure 4:
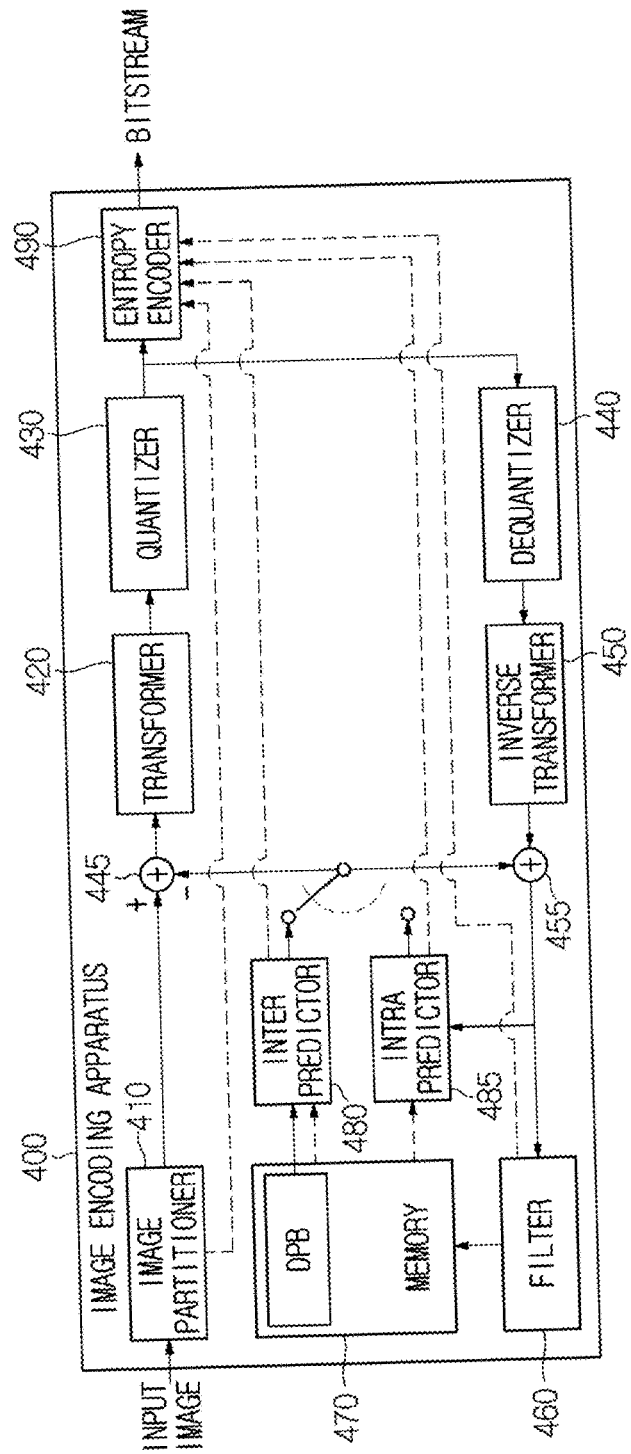
FIG. 4 is a view schematically illustrating an image encoding apparatus according to an embodiment of the present disclosure.

FIG. 4 is a view schematically illustrating an image encoding apparatus according to an embodiment of the present disclosure. The image encoding apparatus 400 of FIG. 4 may correspond to the encoder 20 of the transmitting apparatus A described with reference to FIG. 1

Referring to FIG. 4, the image encoding apparatus 400 may include an image partitioner 410, a subtractor 415, a transformer 420, a quantizer 430, a dequantizer 440, an inverse transformer 450, an adder 455, a filter 460, a memory 470, an inter prediction unit 480, an intra prediction unit 485 and an entropy encoder 490. The inter prediction unit 480 and the intra prediction unit 485 may be collectively referred to as a "predictor". The transformer 420, the quantizer 430, the dequantizer 440 and the inverse transformer 450 may be included in a residual processor. The residual processor may further include the subtractor 415.

All or at least some of the plurality of components configuring the image encoding apparatus 400 may be configured by one hardware component (e.g., an encoder or a processor) in some embodiments. In addition, the memory 470 may include a decoded picture buffer (DPB) and may be configured by a digital storage medium.

The image partitioner 410 may partition an input image (or a picture or a frame) input to the image encoding apparatus 400 into one or more processing units. For example, the processing unit may be called a coding unit (CU). The coding unit may be obtained by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth obtained by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 480 or the intra prediction unit 485) may perform prediction on a block to be processed (current block) and generate a predicted block including prediction samples for the current block. The prediction unit may determine whether intra prediction or inter prediction is applied on a current block or CU unit. The prediction unit may generate various information related to prediction of the current block and transmit the generated information to the entropy encoder 490. The information on the prediction may be encoded in the entropy encoder 490 and output in the form of a bitstream.

The intra prediction unit 485 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 485 may determine the prediction mode applied to the current block by using a prediction mode applied to a neighboring block.

The inter prediction unit 480 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 480 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 480 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 415 may generate a residual signal (residual block or residual sample array) by subtracting the prediction signal (predicted block or prediction sample array) output from the prediction unit from the input image signal (original block or original sample array). The generated residual signal may be transmitted to the transformer 420.

The transformer 420 may generate transform coefficients by applying a transform technique to the residual signal. For example, the transform technique may include at least one of a discrete cosine transform (DCT), a discrete sine transform (DST), a karhunen-loeve transform (KLT), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than square.

The quantizer 430 may quantize the transform coefficients and transmit them to the entropy encoder 490. The entropy encoder 490 may encode the quantized signal (information on the quantized transform coefficients) and output a bitstream. The information on the quantized transform coefficients may be referred to as residual information. The quantizer 430 may rearrange quantized transform coefficients in a block type into a one-dimensional vector form based on a coefficient scanning order and generate information on the quantized transform coefficients based on the quantized transform coefficients in the one-dimensional vector form.

The entropy encoder 490 may perform various encoding methods such as, for example, exponential Golomb, context-adaptive variable length coding (CAVLC), context-adaptive binary arithmetic coding (CABAC), and the like. The entropy encoder 490 may encode information required for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 490 and/or a storage unit (not shown) storing the signal may be included as internal/external element of the image encoding apparatus 400. Alternatively, the transmitter may be provided as the component of the entropy encoder 490.

The quantized transform coefficients output from the quantizer 430 may be used to generate a residual signal. For example, the residual signal (residual block or residual samples) may be reconstructed by applying dequantization and inverse transform to the quantized transform coefficients through the dequantizer 440 and the inverse transformer 450.

The adder 455 adds the reconstructed residual signal to the prediction signal output from the inter prediction unit 480 or the intra prediction unit 485 to generate a reconstructed signal (reconstructed picture, reconstructed block, reconstructed sample array). If there is no residual for the block to be processed, such as a case where the skip mode is applied, the predicted block may be used as the reconstructed block. The adder 455 may be called a reconstructor or a reconstructed block generator. The generated reconstructed signal may be used for intra prediction of a next block to be processed in the current picture and may be used for inter prediction of a next picture through filtering as described below.

Meanwhile, in a picture encoding and/or reconstruction process, luma mapping with chroma scaling (LMCS) is applicable.

The filter 460 may improve subjective/objective image quality by applying filtering to the reconstructed signal. For example, the filter 460 may generate a modified reconstructed picture by applying various filtering methods to the reconstructed picture and store the modified reconstructed picture in the memory 470, specifically, a DPB of the memory 470. The various filtering methods may include, for example, deblocking filtering, a sample adaptive offset, an adaptive loop filter, a bilateral filter, and the like. The filter 460 may generate various information related to filtering and transmit the generated information to the entropy encoder 490 as described later in the description of each filtering method. The information related to filtering may be encoded by the entropy encoder 490 and output in the form of a bitstream.

The modified reconstructed picture transmitted to the memory 470 may be used as the reference picture in the inter prediction unit 480. When inter prediction is applied through the image encoding apparatus 400, prediction mismatch between the image encoding apparatus 400 and the image decoding apparatus may be avoided and encoding efficiency may be improved.

The DPB of the memory 470 may store the modified reconstructed picture for use as a reference picture in the inter prediction unit 480. The memory 470 may store the motion information of the block from which the motion information in the current picture is derived (or encoded) and/or the motion information of the blocks in the picture that have already been reconstructed. The stored motion information may be transmitted to the inter prediction unit 480 and used as the motion information of the spatial neighboring block or the motion information of the temporal neighboring block. The memory 470 may store reconstructed samples of reconstructed blocks in the current picture and may transfer the reconstructed samples to the intra prediction unit 485.

Overview of image decoding apparatus

Figure 5:
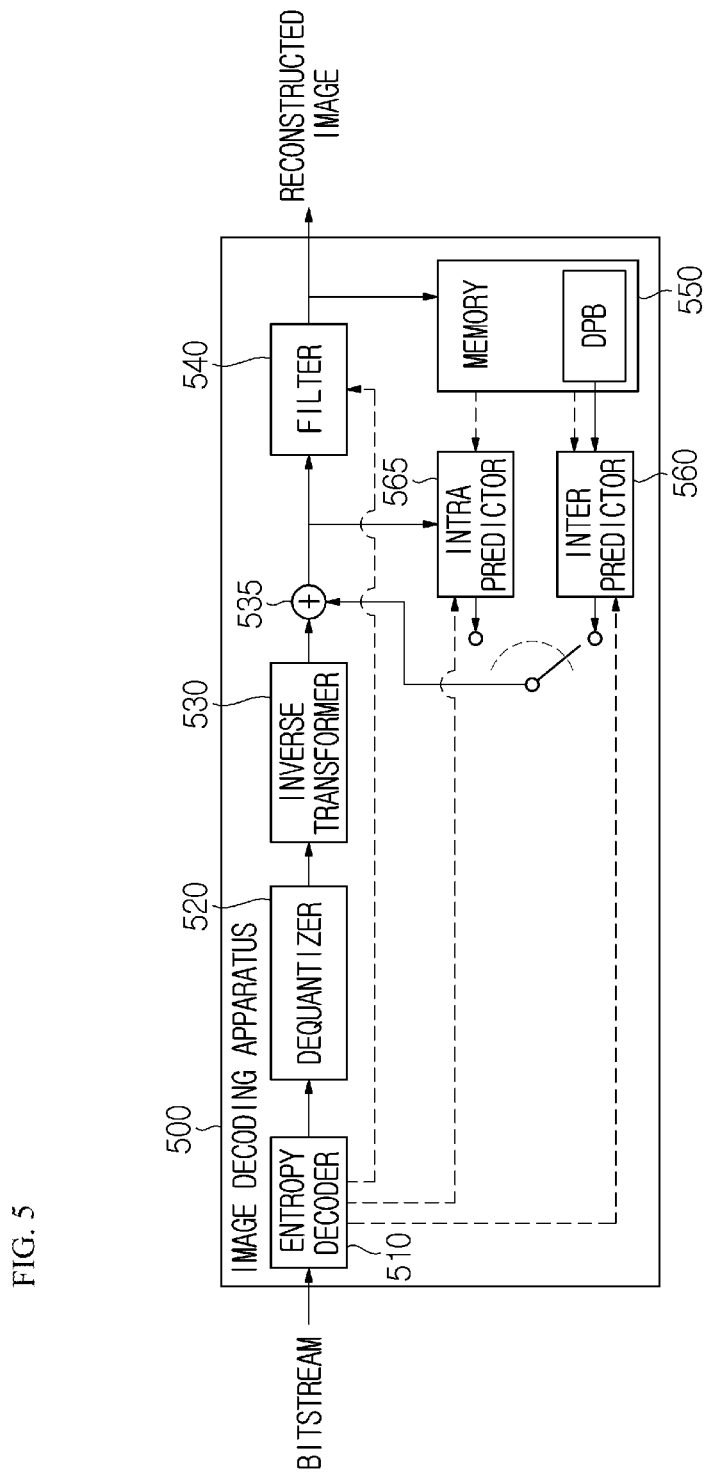
FIG. 5 is a view schematically illustrating an image decoding apparatus according to an embodiment of the present disclosure.

FIG. 5 is a view schematically illustrating an image decoding apparatus according to an embodiment of the present disclosure. The image decoding apparatus 500 of FIG. 5 may correspond to the decoder 80 of the receiving apparatus A described with reference to FIG. 1

Referring to FIG. 5, the image decoding apparatus 500 may include an entropy decoder 510, a dequantizer 520, an inverse transformer 530, an adder 535, a filter 540, a memory 550, an inter prediction unit 560 and an intra prediction unit 565. The inter prediction unit 560 and the intra prediction unit 565 may be collectively referred to as a "predictor". The dequantizer 520 and the inverse transformer 530 may be included in a residual processor.

All or at least some of a plurality of components configuring the image decoding apparatus 500 may be configured by a hardware component (e.g., a decoder or a processor) according to an embodiment. In addition, the memory 550 may include a decoded picture buffer (DPB) or may be configured by a digital storage medium.

The image decoding apparatus 500, which has received a bitstream including video/image information, may reconstruct an image by performing a process corresponding to a process performed by the image encoding apparatus 100 of FIG. 4. For example, the image decoding apparatus 500 may perform decoding using a processing unit applied in the image encoding apparatus. Thus, the processing unit of decoding may be a coding unit, for example. The coding unit may be obtained by partitioning a coding tree unit or a largest coding unit. The reconstructed image signal decoded and output through the image decoding apparatus 500 may be reproduced through a reproducing apparatus (not shown).

The image decoding apparatus 500 may receive a signal generated by the image encoding apparatus of FIG. 4 in the form of a bitstream. The received signal may be decoded through the entropy decoder 510. For example, the entropy decoder 510 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 510 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 510 may be provided to the prediction unit (the inter prediction unit 560 and the intra prediction unit 565), and the residual value on which the entropy decoding was performed in the entropy decoder 510, that is, the quantized transform coefficients and related parameter information, may be input to the dequantizer 520. In addition, information on filtering among information decoded by the entropy decoder 510 may be provided to the filter 540. Meanwhile, a receiver (not shown) for receiving a signal output from the image encoding apparatus may be further configured as an internal/external element of the image decoding apparatus 500, or the receiver may be a component of the entropy decoder 510.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 510. The sample decoder may include at least one of the dequantizer 520, the inverse transformer 530, the adder 535, the filter 540, the memory 550, the inter prediction unit 560 or the intra prediction unit 565.

The dequantizer 520 may dequantize the quantized transform coefficients and output the transform coefficients. The dequantizer 520 may rearrange the quantized transform coefficients in the form of a two-dimensional block. In this case, the rearrangement may be performed based on the coefficient scanning order performed in the image encoding apparatus. The dequantizer 520 may perform dequantization on the quantized transform coefficients by using a quantization parameter (e.g., quantization step size information) and obtain transform coefficients.

The inverse transformer 530 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 510 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 565 may predict the current block by referring to the samples in the current picture. The description of the intra prediction unit 485 is equally applied to the intra prediction unit 565.

The inter prediction unit 560 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 560 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 535 may generate a reconstructed signal (reconstructed picture, reconstructed block, reconstructed sample array) by adding the obtained residual signal to the prediction signal (predicted block, predicted sample array) output from the prediction unit (including the inter prediction unit 560 and/or the intra prediction unit 565). If there is no residual for the block to be processed, such as when the skip mode is applied, the predicted block may be used as the reconstructed block. The description of the adder 155 is equally applicable to the adder 535. The adder 535 may be called a reconstructor or a reconstructed block generator. The generated reconstructed signal may be used for intra prediction of a next block to be processed in the current picture and may be used for inter prediction of a next picture through filtering as described below.

Meanwhile, in a picture decoding process, luma mapping with chroma scaling (LMCS) is applicable.

The filter 540 may improve subjective/objective image quality by applying filtering to the reconstructed signal. For example, the filter 540 may generate a modified reconstructed picture by applying various filtering methods to the reconstructed picture and store the modified reconstructed picture in the memory 550, specifically, a DPB of the memory 550. The various filtering methods may include, for example, deblocking filtering, a sample adaptive offset, an adaptive loop filter, a bilateral filter, and the like.

The (modified) reconstructed picture stored in the DPB of the memory 550 may be used as a reference picture in the inter prediction unit 560. The memory 550 may store the motion information of the block from which the motion information in the current picture is derived (or decoded) and/or the motion information of the blocks in the picture that have already been reconstructed. The stored motion information may be transmitted to the inter prediction unit 560 so as to be utilized as the motion information of the spatial neighboring block or the motion information of the temporal neighboring block. The memory 550 may store reconstructed samples of reconstructed blocks in the current picture and transfer the reconstructed samples to the intra prediction unit 565.

In the present disclosure, the embodiments described in the filter 460, the inter prediction unit 480, and the intra prediction unit 485 of the image encoding apparatus 400 may be equally or correspondingly applied to the filter 540, the inter prediction unit 560, and the intra prediction unit 565 of the image decoding apparatus 500.

The quantizer of the encoding apparatus may derive quantized transform coefficients by applying quantization to transform coefficients, and the dequantizer of the encoding apparatus or the dequantizer of the decoding apparatus ma derive transform coefficients by applying dequantization to the quantized transform coefficients. In video coding, a quantization rate may be changed and a compression rate may be adjusted using the changed quantization rate. From an implementation point of view, in consideration of complexity, a quantization parameter (QP) may be used instead of directly using the quantization rate. For example, a quantization parameter having an integer value of 0 to 63 may be used and each quantization parameter value may correspond to an actual quantization rate. In addition, a quantization parameter $QP_y$ for a luma component (luma sample) and a quantization parameter $QP_c$ for a chroma component (chroma sample) may be differently set.

In a quantization process, a transform coefficient C may be received as input and divided by quantization rate Q step , and a quantized transform coefficient C' may be derived based on this. In this case, in consideration of computational complexity, the quantization rate is multiplied by a scale to form an integer and shift operation may be performed by a value corresponding to the scale value. Based on the product of the quantization rate and the scale value, a quantization scale may be derived. That is, the quantization scale may be derived according to QP. In this case, by applying the quantization scale to the transform coefficient C, the quantized transform coefficient C' may be derived based on this.

A dequantization process is an inverse process of the quantization process, and the quantized transform coefficient C' may be multiplied by the quantization rate $Q_{step}$, thereby deriving a reconstructed transform coefficient C" based on this. In this case, a level scale may be derived according to the quantization parameter, the level scale may be applied to the quantized transform coefficient C', thereby deriving the reconstructed transform coefficient C" based on this. The reconstructed transform coefficient C" may be slightly different from the original transform coefficient C due to loss in the transform and/or quantization process. Accordingly, even the encoding apparatus may perform dequantization in the same manner as the decoding apparatus.

Meanwhile, adaptive frequency weighting quantization technology of adjusting a quantization strength according to frequency may be applied. The adaptive frequency weighting quantization technology may correspond to a method of differently applying a quantization strength according to the frequency. In adaptive frequency weighting quantization, the quantization strength may differently be applied according to the frequency using a predefined quantization scaling matrix. That is, the above-described quantization/dequantization process may be performed further based on the quantization scaling matrix.

For example, a different quantization scaling matrix may be used according to a size of a current block and/or whether a prediction mode applied to the current block in order to generate a residual signal of the current block is inter prediction or intra prediction. The quantization scaling matrix may also be referred to as a quantization matrix or a scaling matrix. The quantization scaling matrix may be predefined. In addition, frequency quantization scale information for the quantization scaling matrix for frequency adaptive scaling may be constructed/encoded by the encoding apparatus and signaled to the decoding apparatus. The frequency quantization scale information may be referred to as quantization scaling information. The frequency quantization scale information may include scaling list data scaling_list_data.

Based on the scaling list data, the quantization scaling matrix may be derived. In addition, the frequency quantization scale information may include present flag information specifying whether the scaling list data is present. Alternatively, when the scaling list data is signaled at a higher level (e.g., SPS), information specifying whether the scaling list data is modified at a lower level (e.g., PPS or tile group header, etc.) may be further included.

Figure 6:
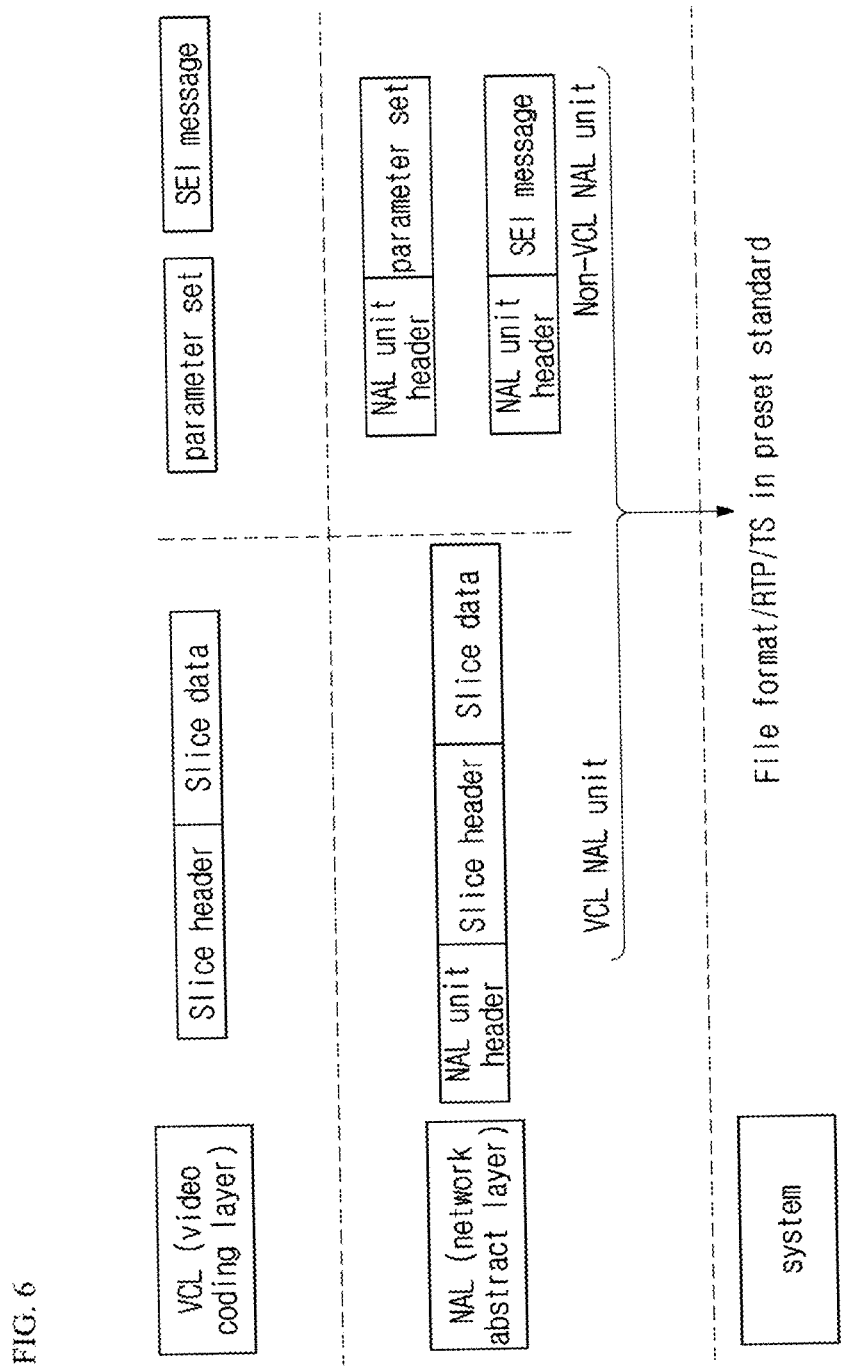
FIG. 6 is a view illustrating an example of a layer structure for a coded image/video.

FIG. 6 is a view illustrating an example of a layer structure for a coded image/video.

The coded image/video is classified into a video coding layer (VCL) for an image/video decoding process and handling itself, a lower system for transmitting and storing encoded information, and a network abstraction layer (NAL) present between the VCL and the lower system and responsible for a network adaptation function.

In the VCL, VCL data including compressed image data (slice data) may be generated or a supplemental enhancement information (SEI) message additionally required for a decoding process of an image or a parameter set including information such as a picture parameter set (PPS), a sequence parameter set (SPS) or a video parameter set (VPS) may be generated.

In the NAL, header information (NAL unit header) may be added to a raw byte sequence payload (RBSP) generated in the VCL to generate a NAL unit. In this case, the RBSP refers to slice data, a parameter set, an SEI message generated in the VCL. The NAL unit header may include NAL unit type information specified according to RBSP data included in a corresponding NAL unit.

As shown in FIG. 6, the NAL unit may be classified into a VCL NAL unit and a non-VCL NAL unit according to the type of the RBSP generated in the VCL. The VCL NAL unit may mean a NAL unit including information on an image (slice data), and the Non-VCL NAL unit may mean a NAL unit including information (parameter set or SEI message) required to decode an image.

The VCL NAL unit and the Non-VCL NAL unit may be attached with header information and transmitted through a network according to the data standard of the lower system. For example, the NAL unit may be modified into a data format of a predetermined standard, such as H.266/VVC file format, RTP (Real-time Transport Protocol) or TS (Transport Stream), and transmitted through various networks.

As described above, in the NAL unit, a NAL unit type may be specified according to the RBSP data structure included in the corresponding NAL unit, and information on the NAL unit type may be stored in a NAL unit header and signaled. For example, this may be largely classified into a VCL NAL unit type and a non-VCL NAL unit type depending on whether the NAL unit includes image information (slice data). The VCL NAL unit type may be subdivided according to the property/type of the picture included in the VCL NAL unit, and the Non-VCL NAL unit type may be subdivided according to the type of a parameter set.

An example of VCL NAL unit types according to the picture type is as follows.

"IDR_W_RADL", "IDR_N_LP": VCL NAL unit type for an instantaneous decoding refresh (IDR) picture which is a type of an IRAP (Intra Random Access Point) picture;

The IDR picture may be a first picture in decoding order in a bitstream or a picture after the first picture. A picture having a NAL unit type such as "IDR_W_RADL" may have one or more Random Access Decodable Leading (RADL) pictures associated with the picture. In contrast, a picture having a NAL unit type such as "IDR_N_LP" does not have any leading picture associated with the picture.

"CRA_NUT": VCL NAL unit type for a Clean Random Access (CRA) picture which is a type of IRAP picture;

The CRA picture may be a first picture in decoding order in a bitstream or may be a picture after the first picture. The CRA picture may be associated with a RADL or RASL (Random Access Skipped Leading) picture.

"GDR_NUT": VCL NAL unit type for a random accessible Gradual Decoding Refresh (GDR) picture;

"STSA_NUT": VCL NAL unit type for a random accessible Step-wise Temporal Sublayer Access (STSA) picture;

"RADL_NUT": VCL NAL unit type for a RADL picture which is a leading picture;

"RASL_NUT": VCL NAL unit type for a RASL picture which is a leading picture;

"TRAIL_NUT": VCL NAL unit type for a trailing picture;

A trailing picture is a non-IRAP picture, which may follow the IRAP picture or GDR picture associated with the trailing picture in output order, and may follow the IRAP picture associated with the trailing picture in decoding order.

Next, an example of non-VCL NAL unit types according to the parameter set type is as follows.

"DCI_NUT": non-VCL NAL unit type including decoding capability information (DCI)

"VPS_NUT": non-VCL NAL unit type including a video parameter set (VPS)

"SPS_NUT": non-VCL NAL unit type including a sequence parameter set (SPS)

"PPS_NUT": non-VCL NAL unit type including a picture parameter set (PPS)

"PREFIX_APS_NUT", "SUFFIX_APS_NUT": non-VCL NAL unit type including an adaptation parameter set (APS)

"PH_NUT": non-VCL NAL unit type including a picture header

The above-described NAL unit types may be identified by predetermined syntax information (e.g., nal_unit_type) included in the NAL unit header.

Meanwhile, in the present disclosure, the image/video information encoded in the form of a bitstream may not only include picture partitioning information, intra/inter prediction information, residual information and/or in-loop filtering information, etc. but also include slice header information, picture header information, APS information, PPS information, SPS information, VPS information, and/or DCI. In addition, the encoded image/video information may further include general constraint information (GCI) and/or NAL unit header information. According to embodiments of the present disclosure, the encoded image/video information may be encapsulated into a media file of a predetermined format (e.g., ISO BMFF) and transmitted to a receiving apparatus.

Media file

The encoded image information may be configured (or formatted) based on a predetermined media file format to generate a media file. For example, the encoded image information may form a media file (segment) based on one or more NAL units/sample entries for the encoded image information.

A media file may include sample entry(s) and track(s). In one example, a media file may include various records, and each record may include information related to a media file format or information related to an image. In one example, one or more NAL units may be stored in a configuration record (or decoder configuration record) field in the media file. Additionally, the media file may contain an operating point record and/or an operating point group box. In this disclosure, a decoder configuration record supporting Versatile Video Coding (VVC) may be referred to as a VVC decoder configuration record. Likewise, an operating point record supporting VVC may be referred to as a VVC operating point record.

The term "sample" used in the media file format may mean all data associated with a single time or single element of any one of three sample arrays (Y, Cb, Cr) representing a picture. When the term "sample" is used in the context of a track (in a media file format), "sample" may refer to all data associated with a single time of the track. Here, the time may correspond to a decoding time or a composition time. Also, when the term "sample" is used in the context of a picture (e.g., luma sample), "sample" may indicate a single element of any one of three sample arrays representing the picture.

Figure 7:
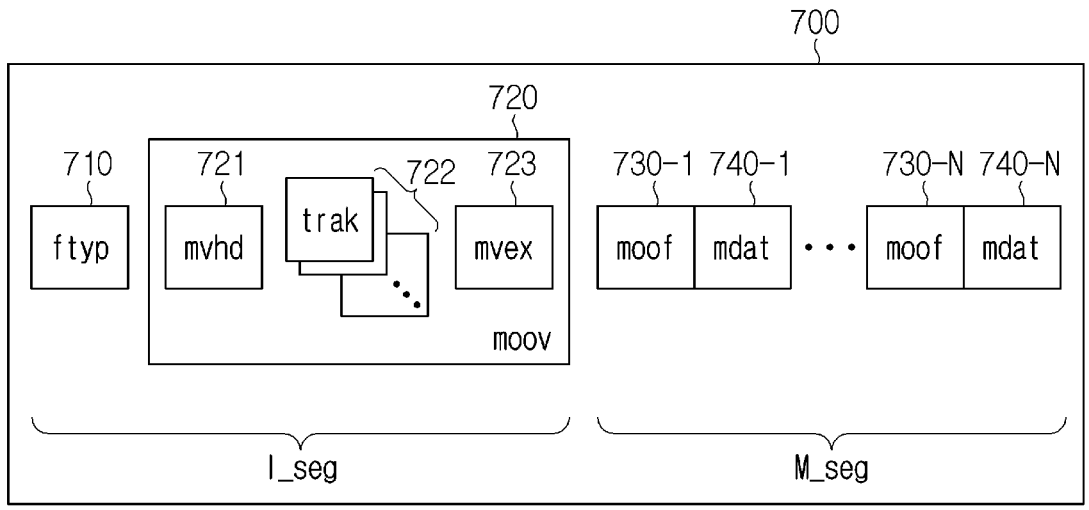
FIG. 7 is a view illustrating an example of a media file structure.

FIG. 7 is a view illustrating an example of a media file structure.

As described above, in order to store and transmit media data such as audio, video, or image, a standardized media file format may be defined. In some embodiments, the media file may have a file format according to the ISO base media file format (ISO BMFF).

A media file may include one or more boxes. Here, the box may be a data block or object including media data or metadata related to the media data. Within a media file, boxes may form a hierarchical structure. Accordingly, the media file may have a form suitable for storage and/or transmission of large-capacity media data. Also, the media file may have a structure that facilitates access to specific media data.

Referring to FIG. 7, the media file 700 may include an ftyp box 710, a moov box 720, a moof box 730, and an mdat box 740.

The ftyp box 710 may include a file type, file version, and/or compatibility related information of the media file 700. In some embodiments, the ftyp box 710 may be located at the beginning of the media file 700.

The moov box 720 may include metadata describing the media data in the media file 700. In some embodiments, the moov box 720 may be present in an uppermost layer among metadata-related boxes. Also, the moov box 720 may include header information of the media file 700. For example, the moov box 720 may include a decoder configuration record as decoder configuration information.

The moov box 720 is a sub-box, and may include an mvhd box 721, a trak box 722 and an mvex box 723.

The mvhd box 721 may include presentation-related information (e.g., media creation time, change time, period, etc.) of media data in the media file 700.

The trak box 722 may include metadata for a track of media data. For example, the trak box 722 may contain stream-related information, presentation-related information, and/or access-related information for an audio track or a video track. A plurality of trak boxes 722 may be present according to the number of tracks present in the media file 700. An example of the structure of the trak box 722 will be described later with reference to FIG. 8.

The mvex box 723 may include information on whether one or more movie fragments is present in the media file 700. The movie fragment may be a part of media data obtained by dividing media data in the media file 700. The movie fragment may include one or more coded pictures. For example, the movie fragment may include one or more picture groups (GOPs), and each picture group may include a plurality of coded frames or pictures. The movie fragment may be stored in each of the mdat boxes 740-1 to 740-N (where N is an integer greater than or equal to 1).

The moof boxes 730-1 to 730-N (where N is an integer greater than or equal to 1) may include metadata for movie fragments, that is, mdat boxes 740-1 to 740-N. In some embodiments, the moof boxes 730-1 to 730-N may be present in an uppermost layer among metadata-related boxes of the movie fragment.

The mdat boxes 740-1 to 740-N may include actual media data. A plurality of mdat boxes 740-1 to 740-N may be present according to the number of movie fragments present in the media file 700. Each of the mdat box 740-1 to 740-N may include one or more audio samples or video samples. In one example, a sample may mean an access unit (AU). When the decoder configuration record is stored in the sample entry, the decoder configuration record may include a size of a length field for indicating the length of a Network Abstraction Layer (NAL) unit to which each sample belongs as well as a parameter set.

In some embodiments, the media file 700 may be processed and stored and/or transmitted in units of segments. The segment may include an initialization segment I_seg and a media segment M_seg.

The initialization segment I_seg may be an object type data unit including initialization information for accessing a representation. The initialization segment I_seg may include the aforementioned ftyp box 710 and/or moov box 720.

The media segment M_seg may be an object type data unit including temporally divided media data for a streaming service. The media segment M_seg may include the aforementioned moof boxes 730-1 to 230-N and mdat boxes 740-1 to 740-N. Although not shown in FIG. 7, the media segment M_seg may further include a styp box including segment type related information and a sidx box including identification information of subsegments included in the media file 700 (optional).

Figure 8:
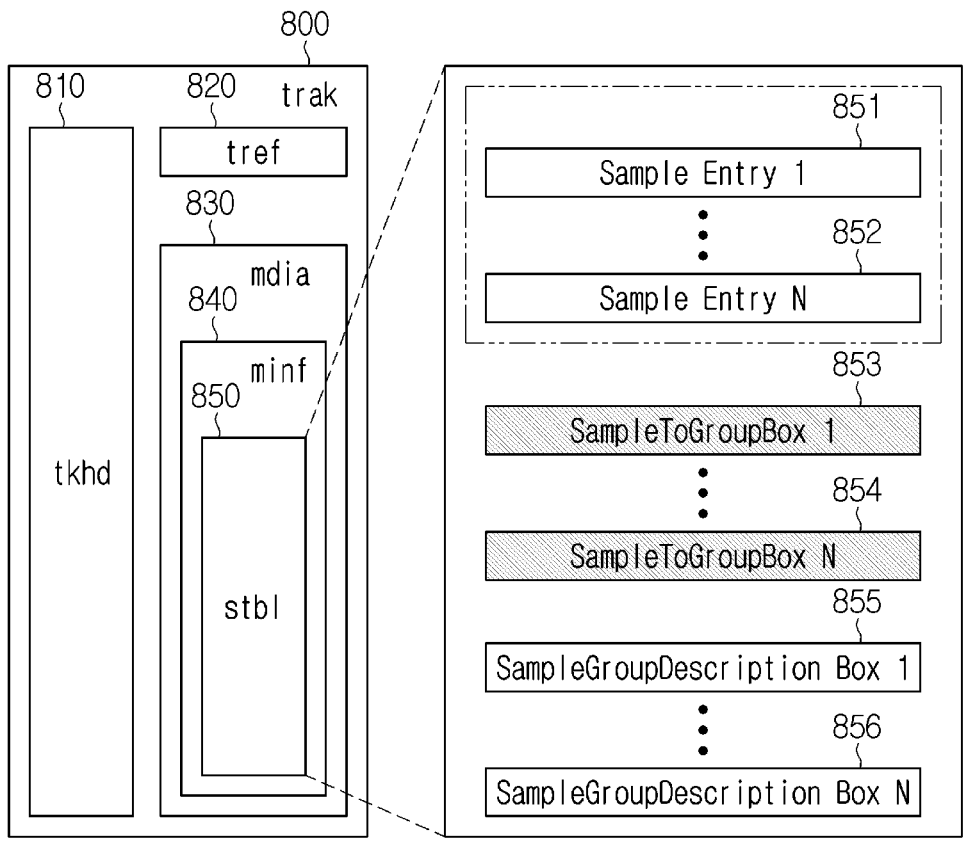
FIG. 8 is a view illustrating an example of a trak box structure of FIG. 7.

FIG. 8 is a view illustrating an example of a trak box structure of FIG. 7.

Referring to FIG. 8, the trak box 800 may include a tkhd box 810, a tref box 820 and a mdia box 830.

The tkhd box 810 is a track header box, and may include header information of a track (hereinafter, referred to as a 'corresponding track') indicated by the trak box 800, for example, a creation/modification time of the corresponding track, a track identifier and the like.

The tref box 820 is a track reference box, and may include reference information of the corresponding track, for example, a track identifier of another track referenced by the corresponding track.

The mdia box 830 may include information and objects describing media data in the corresponding track. In some embodiments, the mdia box 830 may include a minf box 840 that provides information on the media data. Also, the minf box 840 may include an stbl box 850 including metadata for samples including the media data.

The stbl box 850 is a sample table box, and may include position information, time information, and the like of samples in a track. A reader may determine a sample type, a sample size within a container and an offset based on the information provided by the stbl box 850, and locate samples in the correct time order.

The stbl box 850 may include one or more sample entry boxes 851 and 852. Sample entry boxes 851 and 852 may provide various parameters for a particular sample. For example, a sample entry box for a video sample may include the width, height, resolution and/or frame count of the video sample. In addition, a sample entry box for an audio sample may include a channel count, a channel layout and/or a sampling rate of the audio sample. In some embodiments, the sample entry boxes 851 and 852 may be included in a sample description box (not shown) in the stbl box 850. The sample description box may provide detailed information on a coding type applied to a sample and any initialization information required for the coding type.

In addition, the stbl box 850 may include one or more sample-to-group boxes 853 and 854 and one or more sample group description boxes 855 and 856.

The sample-to-group boxes 853 and 854 may indicate a sample group to which a sample belongs. For example, the sample-to-group boxes 853 and 854 may include a grouping type syntax element (e.g., grouping_type) indicating the type of the sample group. Also, the sample-to-group boxes 853 and 854 may contain one or more sample group entries. The sample group entry may include a sample count syntax element (e.g., sample_count) and a group description index syntax element (e.g., group_description_index). Here, the sample count syntax element may indicate the number of contiguous samples to which the corresponding group description index is applied. The sample group may include a stream access point (SAP) sample group, a random access recovery point sample group, and the like, and details thereof will be described later.

The sample group description boxes 855 and 856 may provide a description of a sample group. For example, the sample group description boxes 855 and 856 may include a grouping type syntax element (e.g., grouping_type). The sample group description boxes 855 and 856 may correspond to the sample-to-group boxes 853 and 854 having the same grouping type syntax element value. Also, the sample group description boxes 855 and 856 may include one or more sample group description entries. The sample group description entries may include a 'spor' sample group description entry, a 'minp' sample group description entry, a 'roll' sample group description entry, and the like.

As described above with reference to FIGS. 7 and 8, media data may be encapsulated into a media file according to a file format such as ISO BMFF. In addition, the media file may be transmitted to the receiving apparatus through an image signal according to the MMT standard or the MPEG-DASH standard.

FIG. 9 is a view illustrating an example of an image signal structure.

Referring to FIG. 9, an image signal conforms to the MPEG-DASH standard and may include an MPD 910 and a plurality of representations 920-1 to 920-N.

The MPD 910 is a file including detailed information on media presentation, and may be expressed in an XML format. The MPD 910 may include information on a plurality of representations 920-1 to 920-N (e.g., bit rate of streaming content, image resolution, frame rate, etc.) and information on URLs of HTTP resources (e.g., initialization segment and media segments).

Each of the representations 920-1 to 920-N (where N is an integer greater than 1) may be divided into a plurality of segments S-1 to S-K (where K is an integer greater than 1). Here, the plurality of segments S-1 to S-K may correspond to the initialization segment and media segments described above with reference to FIG. 7. The K-th segment S-K may represent the last movie fragment in each of the representations 920-1 to 920-N. In some embodiments, the number (that is, the value of K) of segments S-1 to S-K included in each of the representations 920-1 to 920-N may be different from each other.

Each of the segments S-1 to S-K may include actual media data, such as one or more video or image samples. The characteristics of the video or image samples contained within each of the segments S-1 to S-K may be described by the MPD 910.

Each of the segments S-1 to S-K has a unique URL (Uniform Resource Locator) and thus may be accessed and reconstructed independently.

Meanwhile, three types of elementary streams may be defined as follows to store VVC content.

Video elementary stream: The video elementary stream includes VCL NAL units, but does not include parameter sets, DCI or OPI NAL units. At this time, parameter sets, DCI or OPI NAL units may be stored in one or more sample entries. The video elementary stream may include non-VCL NAL units excluding parameter sets, DCI NAL units, and OPI NAL units.

Video and parameter set elementary stream: The video and parameter set elementary stream includes VCL NAL units. Also, the video and parameter set elementary stream may include parameter sets, DCI or OPI NAL units, and may have parameter sets, DCI or OPI NAL units stored in one or more sample entries.

Non-VCL elementary stream: A non-VCL elementary stream includes only non-VCL NAL units that are synchronized with the elementary stream carried within the video track.

In addition, the VVC file format defines various types of tracks as follows.

VVC track: A VVC track may indicate the VVC bitstream, by including NAL units in samples and sample entries, possibly by referencing VVC tracks containing other sublayers of the VVC bitstream, and possibly by referencing VVC subpicture tracks. When a VVC track references VVC subpicture tracks, the VVC track may be referred to as a VVC base track.

VVC non-VCL track: Adaptive Parameter Sets (APSs) carrying Adaptive Loop Filter (ALF), Luma Mapping with Chroma Scaling (LMCS) or scaling list parameters and other non-VCL NAL units may be stored in a track that is separate from the track containing the VCL NAL units and transmitted through the track. The VVC non-VCL track may refer to the track. The VVC non-VCL track does not include parameter sets, DCI or OPI NAL units in sample entries.

VVC subpicture track: A VVC subpicture track may contain a sequence of one or more VVC subpictures or a sequence of one or more complete slices forming a rectangular area. In addition, a sample of a VVC subpicture track may contain one or more complete subpictures that are contiguous in decoding order or one or more complete slices that are contiguous in decoding order and form a rectangular area. VVC subpictures or slices included in each sample of a VVC subpicture track may be contiguous in decoding order.

On the other hand, VVC non-VCL tracks and VVC subpicture tracks may enable optimal delivery of VVC video in streaming applications. Each of the tracks may be carried in its own DASH representations. In addition, for decoding and rendering of a subset of tracks, a DASH representation containing a subset of VVC subpicture tracks and a DASH representation containing non-VCL tracks may be requested by the client, segment by segment. In this way, it is possible to avoid redundant transmission of APS and other non-VCL NAL units.

Overview of VVC decoder configuration record

When the VVC decoder configuration record (hereinafter abbreviated as 'decoder configuration record') is stored in the sample entry, the decoder configuration record may include the size of a length field used for each sample in order to indicate lengths and parameter sets of NAL units, DCI, OPI and SEI NAL units. The decoder configuration record may be framed externally. The size of the decoder configuration record may be provided by a structure containing the decoder configuration record.

The decoder configuration record may include a version field. An incompatible change to the decoder configuration record may be indicated by a change of a version number. If the version number is not recognized, the reader shall not decode the decoder configuration record or a stream to which the decoder setting record applies. A compatible extension to the decoder configuration record may extend the decoder configuration record and may not change a configuration version code.

If a track contains a VVC bitstream natively or through 'subp' track references, VvcPtlRecord shall be present in the decoder configuration record, and a specific output layer set for the VVC bitstream may be indicated by an output_layer_set_idx field. If ptl_present_flag is equal to 0 in the decoder configuration record of the track, the track shall have an 'oref' track reference to an ID that may refer to a VVC track or an 'opeg' entity group.

Values of syntax elements of VvcPTLRecord, chroma_format_idc and bit_depth_minus8 shall be valid for all parameter sets referenced when the stream described by the decoder configuration record is decoded. In this regard, the following restrictions may apply.

A profile indicator general_profile_idc shall indicate a profile to which the output layer set identified by output_layer_set_idx in the decoder configuration record conforms. If different profiles are marked for different CVSs of the output layer set identified by output_layer_set_idx in the decoder configuration record, the stream may need examination to determine which profile the entire stream conforms to. If the entire stream is not examined or there is no profile that the entire stream conforms to as the result of examination, the entire stream may be divided into two or more substreams with separate configuration records that may satisfy these rules.

A tier indicator general_tier_flag shall indicate a tier greater than or equal to a highest tier indicated in all profile_tier_level()syntax structures (all parameter sets) to which the output layer set identified by output_layer_set_idx in the decoder configuration record conforms.

Each bit of general_constraint_info may be set only in all general_constraints_info() syntax structures in all profile_tier_level()syntax structures (all parameter sets) to which the output layer set identified by output_layer_set_idx in the decoder configuration record conforms.

A level indicator general_level_idc shall indicate a level of capability which is greater than or equal to the highest level in all profile_tier_level()syntax structures (all parameter sets) to which the output layer set identified by output_layer_set_idx in the decoder configuration record conforms.

The following constraints may be applied to chroma_format_idc.

If the VVC stream, to which the decoder configuration record is applied, is a single-layer bitstream, the value of SPS_chroma_format_idc shall be the same within all SPS referenced by the VCL NAL units in the samples to which the current sample entry description is applied. In addition, the value of chroma_format_idc shall be equal to the value of the sps_chroma_format_idc.

If the VVC stream, to which the decoder configuration record is applied, is a multi-layer bitstream, the value of the vps_ols_dpb_chroma_format[MultiLayerOlsIdx[output_layer_set_idx] shall be the same for all CVSs to which a current sample entry description is applied. In addition, the value of chroma_format_idc shall be equal to the value of the vps_ols_dpb_chroma_format[MultiLayerOlsIdx[output_layer_set_idx].

Next, the following constraints may be applied to bit_depth_minus8.

If the VVC stream, to which the decoder configuration record is applied, is a single-layer bitstream, the value of sps_bitdepth_minus8 shall be the same in all SPS referenced by the VCL NAL units in the samples to which a current sample entry description is applied. In addition, the value of the bit_depth_minus8 shall be equal to the value of the sps_bitdepth_minus8.

If the VVC stream, to which the decoder configuration record is applied, is a multi-layer bitstream, the value of vps_ols_dpb_bitdepth_minus8[MultiLayerOlsIdx[output_layer_set_idx]] shall be the same for all CVSs to which a current sample entry description is applied. In addition, the value of the bit_depth_minus8 shall be equal to the value of the vps_ols_dpb_bitdepth_minus[MultiLayerOlsIdx[output_layer_set_idx]].

Next, the following constraints may be applied to picture_width.

If the VVC stream, to which the decoder configuration record is applied, is a single-layer bitstream, the value of sps_pic_width_max_in_luma_samples shall be the same in all SPS referenced by the VCL NAL units in the samples to which the current sample entry description is applied. In addition, the value of picture_width shall be equal to the value of the sps_pic_width_max_in_luma_samples.

If the VVC stream, to which the decoder configuration record is applied, is a multi-layer bitstream, the value of vps_ols_dpb_pic_width[MultiLayerOlsIdx[output_layer_set_idx]] shall be the same for all CVSs to which a current sample entry description is applied. In addition, the value of picture_width shall be equal to the value of vps_ols_dpb_pic_width[MultiLayerOlsIdx[output_layer_set_idx]].

Next, the following constraints may be applied to picture_height.

If the VVC stream, to which the decoder configuration record is applied, is a single-layer bitstream, the value of sps_pic_height_max_in_luma_samples shall be the same in all SPSs referenced by the VCL NAL units in the samples to which the current sample entry description is applied. In addition, the value of picture_height shall be equal to the value of sps_pic_height_max_in_luma_samples If the VVC stream, to which the decoder configuration record is applied, is a multi-layer bitstream, the value of vps_ols_dpb_pic_height[MultiLayerOlsIdx[output_layer_set_idx]] shall be the same for all CVSs to which a current sample entry description is applied. In addition, the value of picture_height shall be equal to the value of vps_ol-s_dpb_pic_height[MultiLayerOlsIdx[output_layer_set_idx]].

The other important format information used in the VVC video elementary stream as well as an explicit indicator of chroma format and bit depth may be provided within the VVC decoder configuration record. If the color spaces or bit depth indicators of the two sequences are different within the VUI information, two different VVC sample entries may be required.

Meanwhile, there may be an array set to carry initialization non-VCL NAL units. The NAL unit types may be restricted to indicate only DCI, OPI, VPS, SPS, PPS, Prefix APS and Prefix SEI NAL units. NAL units carried within a sample entry may be included immediately after AUD and OPI NAL units or may be included in the beginning of an access unit reconstructed from a first sample referencing the sample entry. In an example, arrays may be arranged in order of DCI, OPI, VPS, SPS, PPS, prefix APS and prefix SEI.

FIG. 10 is a view illustrating a syntax structure for signaling a PTL record.

Referring to FIG. 10, syntax VvcPTLRecord may include a syntax element num_bytes_constraint_info.

The syntax element num_bytes_constraint_info may be used to indicate the length of a general_constraint_info field. The length of the general_constraint_info field may be num_bytes_constraint_info*8-2 bits. The value of num_bytes_constraint_info shall be greater than 0. num_bytes_constraint_info equal to 1 may indicate that gci_present_flag in a general_constraint_info() syntax structure represented by the general_constraint_info field is For reference, the semantics of gci_present_flag may be defined in the standard documents such as VVC. For example, gci_present_flag equal to 1 may indicate that general constraint information (GCI) syntax elements are present in the general_constraint_info()syntax structure. In contrast, gci_present_flag equal to 0 may indicate that GCI syntax elements are not present in the general_constraint_info() syntax structure.

In addition, syntax VvcPTLRecord may include syntax elements general_profile_idc, general_tier_flag, general_level_idc, ptl_frame_only_constraint_flag, ptl_multilayer_enabled_flag, general_constraint_info, sublayer_level_present[j], sublayer_level_idc[i], num_sub_profiles and general_sub_profile jdc[j].

The syntax elements may include matching values for general_profile_idc, general_tier_flag, general_level_idc, ptl_frame_only_constraint_flag, ptl_multilayer_enabled_flag, general_constraint_info() ptl_sublayer_level_present[i], sublayer_level_idc[i], ptl_num_sub_profiles and general_sub_profile idc[j] which are fields or syntax structures defined in the standard document such as ISO/IEC 23090-3 for the stream to which the decoder configuration record is applied.

FIG. 11 is a view illustrating a syntax structure for signaling a decoder configuration record.

Referring to FIG. 11, syntax VvcDecoderConfiguration-Record may include syntax elements lengthSizeMinusOne, ptl_present_flag, output_layer_set_idx, numTemporalLayers and track_ptl.

The syntax element lengthSizeMinusOne plus 1 may indicate the length of a NALUnitLength field in a VVC video stream sample in byte units in a stream to which the decoder setting record is applied. For example, the size of one byte may be indicated by a value 0 of lengthSizeMinusOne. The value of the syntax element (or field) shall be any one of 0, 1, or 3 corresponding to an encoded length of 1, 2, or 4 bytes, respectively.

The syntax element ptl_present_flag may indicate whether a track includes a VVC bitstream corresponding to a specific operating point. Specifically, ptl_present_flag equal to a second value (e.g., 1) may indicate that the track includes a VVC bitstream corresponding to the operating point specified by ouput_layer_set_idx and numTemporalLayers, and all NAL units in the track belong to the operating point. In contrast, ptl_present_flag equal to a first value (e.g., 0) may indicate that the track does not include a VVC bitstream corresponding to a specific operating point, but may include a VVC bitstream corresponding to multiple output layer sets or may include individual layers that do not form an output layer set or individual sublayers other than a sublayer having a Temporand equal to 0.

The syntax element output_layer_set_idx may indicate an index of an output layer set represented by the VVC bitstream included in a track. The value of output_layer_set_idx may be used as the value of a variable TargetOlsIdx provided by external means or an OPI NAL unit for a VVC decoder, in order to decode a bitstream included in the track.

The syntax element numTemporalLayers may indicate whether a track to which the decoder configuration record is applied is temporarily scalable. Specifically, numTemporalLayers greater than 1 may indicate that the track to which the decoder configuration record is applied is temporarily scalable and the number of temporal layers (temporal sublayers or sublayers) included (in the track) may be equal to the value of numTemporalLayers. Also, numTemporalLayers equal to 1 may indicate that the track to which the decoder configuration record is applied is not temporarily scalable. Also, numTemporalLayers equal to 0 may indicate that it is not known whether the track to which the decoder configuration record is applied is temporarily scalable.

The syntax element track_ptl may indicate the profile, tier and level of the output layer set represented by the VVC bitstream included in the track.

In addition, syntax VvcDecoderConfigurationRecord may include syntax elements array_completeness, NAL_unit_type, numNalus, nalUnitLength and nalUnit.

The syntax element array_completeness may indicate whether a given type of NAL unit is present in a stream. Specifically, array_completeness equal to a second value (e.g., 1) may indicate that a given type of all NAL units is present in a following array and not in the stream. Alternatively, array_completeness equal to a first value (e.g., 0) may indicate that a given type of additional NAL units may be present in the stream. The allowed values of array_completeness may be limited by a sample entry name The syntax element NAL_unit_type may indicate the type of NAL units in the following array. In one example, NAL_unit_type may be restricted to take any one of values indicating DCI, OPI, VPS, SPS, PPS, prefix APS or prefix SEI NAL units.

The syntax element numNalus may indicate the number of NAL units of an indicated type included in the decoder configuration record, for the stream to which the decoder configuration record is applied. The SEI array shall include only SEI messages of a 'declarative' nature, that is, messages that provide information about the entire stream. A user data SEI message may correspond to this (declarative) SEI message.

The syntax element nalUnitLength may indicate the length of the NAL unit in bytes.

The syntax element nalUnit may include a DCI, OPI, VPS, SPS, PPS, APS or declarative SEI NAL unit.

The VVC field format allows sample entries of VVC tracks such as 'vvc1' and 'vvi1' to carry DCI (Decoding Capability Information), OPI (Operating Point Information), VPS (Video Parameter Set), SPS (Sequence Parameter Set), PPS (Picture Parameter Set), APS(Adaptation Parameter Set) or declarative SEI (Supplemental Enhancement Information) NAL unit. For each type of non-VCL NAL units, a syntax element numNalus indicating the number of NAL units present in the sample entry may be present.

Meanwhile, a plurality of non-VCL NAL units of the same type may be present in a sample entry. However, for some types, only one non-VCL NAL unit may be present in a sample entry. For example, only one NAL unit type for DCI, OPI and VPS shall be present in a sample entry. Nevertheless, according to the existing VVC file format, a syntax element numNalus indicating the number of NAL units present in the sample entry is present regardless of the NAL unit type. Accordingly, problems such as occurrence of information redundancy and an increase in file size (number of bits) may occur. In addition, when the value of the syntax element numNalus for DCI, OPI and VPS is greater than 1, a problem such as inconsistency with an actual value (i.e., 1) may occur.

In order to solve these problems, according to embodiments of the present disclosure, signaling of the syntax element numNalus indicating the number of NAL units for specific NAL unit types may be removed.

Embodiments of the present disclosure may include at least one of the following aspects. Depending on the embodiment, the aspects may be implemented individually, or may be implemented in a combination of two or more.

(Aspect 1): If a DCI or OPI NAL unit is present in a sample entry of a VVC track, the syntax element numNalus is not present (i.e., is not signaled), and the value of the syntax element numNalus may be inferred to be 1.

(Aspect 2): Alternatively, if a DCI or OPI NAL unit is present in a sample entry of a VVC track, the value of the syntax element numNalus may be limited to 1.

(Aspect 3): When the VPS NAL unit is present in a sample entry of a VVC track and the value of the syntax element array_completeness is equal to a second value (e.g., 1), the syntax element numNalus is not present (i.e., is not signaled), and the value of the syntax element numNalus may be inferred to be 1.

(Aspect 4): Alternatively, when the VPS NAL unit is present in a sample entry of a VVC track and the value of the syntax element array_completeness is equal to a second value (e.g., 1), the value of the syntax element numNalus may be inferred to be 1.

Hereinafter, embodiments of the present disclosure based on the above-described aspects will be described in detail.

Embodiment 1

Embodiment 1 of the present disclosure may be provided based on Aspect 1 and Aspect 3 described above.

Specifically, according to Embodiment 1, when a DCI or OPI NAL unit is present in a sample entry of a VVC track, the syntax element numNalus is not present (i.e., is not signaled) and may be inferred to be 1.

In addition, according to Embodiment 1, when a VPS NAL unit is present in a sample entry of a VVC track and the value of the syntax element array_completeness is equal to a second value (e.g., 1), the syntax element numNalus is not present (i.e., is not signaled) and may be inferred to be 1.

Accordingly, signaling of the syntax element numNalus indicating the number of NAL units for specific NAL unit types (e.g., DCI_NUT and OPI_NUT) may be skipped.

An example of the syntax VvcDecoderConfigurationRecord including the syntax element numNalus according to Embodiment 1 is shown in FIG. 12.

FIG. 12 is a view illustrating an example of a syntax structure for signaling a decoder configuration record according to an embodiment of the present disclosure. The syntax structure of FIG. 12 may be basically the same as the syntax VvcDecoderConfigurationRecord described above with reference to FIG. 11. Hereinafter, differences from the syntax structure of FIG. 11 will be focused upon.

Referring to FIG. 12, the syntax VvcDecoderConfigurationRecord may include syntax elements numOfArrays, array_completeness, and NAL_unit_type.

The syntax element numOfArrays may indicate the number of NAL unit arrays of indicated type(s).

The syntax element array_completeness may indicate whether a given type of NAL unit is present in a stream. Specifically, array_completeness equal to a second value (e.g., 1) may indicate that a predetermined type of all NAL units is present in a following array and not in the stream. Alternatively, array_completeness equal to a first value (e.g., 0) may indicate that a predetermined type of additional NAL units may be present in the stream. The allowed values of array_completeness may be limited by a sample entry name The syntax element NAL_unit_type may indicate the type of NAL units in the following array. In one example, NAL_unit_type may be restricted to take any one of values indicating DCI, OPI, VPS, SPS, PPS, prefix APS or prefix SEI NAL units.

The syntax element numNalus may indicate the number of NAL units of an indicated type included in the decoder configuration record for the stream to which the decoder configuration record is applied. The SEI array shall include only SEI messages of a 'declarative' nature, that is, messages that provide information about the entire stream. A user data SEI message may correspond to this (declarative) SEI message.

The syntax element numNalus may be selectively present (or signaled) based on a predetermined condition related to the NAL unit type.

In one embodiment, the condition may include a first condition that the value of the syntax element NAL_unit_type is neither DCI_NUT nor OPI_NUT (i.e., NAL_unit_type!=DCI_NUT && NAL_unit_type!=OPI_NUT). When the first condition is false (e.g., NAL_unit_type=DCI_NUT or OPI_NUT), the syntax element numNalus may not be present.

In addition, the condition may include a second condition that the value of the syntax element NAL_unit_type is VPS_NUT and the value of the syntax element array_completeness is not a second value (e.g., 1) (i.e., !(NAL_unit_type==VPS_NUT && array_completeness)). When the second condition is false (e.g., NAL_unit_type=VPS_NUT && array_completeness =1), the syntax element numNalus may not be present.

In one embodiment, when the syntax element numNalus is not present (e.g., when the first condition is false), the value of the syntax element numNalus may be inferred to be 1.

As described above, according to Embodiment 1 of the present disclosure, for specific NAL unit types (e.g., DCI_NUT and OPI_NUT) that are constrained to have only one NAL unit in a sample entry, signaling of the syntax element numNalus indicating the number of NAL units may be skipped and inferred to a predetermined value (e.g., 1). Accordingly, occurrence of unnecessary information redundancy may be prevented and the file size (number of bits) may be reduced. In addition, for the specific NAL unit types, it is possible to prevent the syntax element numNalus from having a value that is inconsistent with the actual value (i.e., 1).

Embodiment 2

Embodiment 2 of the present disclosure may be provided based on Aspect 2 and Aspect 4 described above.

Specifically, according to Embodiment 2, when a DCI or OPI NAL unit is present in a sample entry of a VVC track, the value of the syntax element numNalus may be limited to 1.

In addition, according to Embodiment 2, when a VPS NAL unit is present in a sample entry of a VVC track and the value of the syntax element array_completeness is equal to a second value (e.g., 1), the value of the syntax element numNalus may be inferred to be 1.

The syntax VvcDecoderConfigurationRecord structure described above with reference to FIG. 11 may be basically applied equally to Embodiment 2. However, unlike the case of FIG. 11, the following constraints may be added to the syntax element numNalus.

In one embodiment, the value of the syntax element numNalus shall be 1 if one of the following conditions is satisfied.

Condition 1: The value of the syntax element NAL_unit_type is equal to DCI_NUT.

Condition 2: The value of the syntax element NAL_unit_type is equal to OPI_NUT.

Condition 3: The value of the syntax element NAL_unit_type is equal to VPS_NUT and the value of the syntax element array_completeness is equal to a second value (e.g., 1).

Meanwhile, the syntax VvcDecoderConfigurationRecord structure of FIG. 12 may be applied to Embodiment 2. However, even in this case, unlike the case of FIG. 12, the above-described constraints may be added to the syntax element numNalus.

As described above, according to Embodiment 2 of the present disclosure, for specific NAL unit types (e.g., DCI_NUT and OPI_NUT) that are constrained to have only one NAL unit in a sample entry, the value of the syntax element numNalus indicating the number of NAL units may be limited to 1. In addition, for the specific NAL unit types, it is possible to prevent the syntax element numNalus from having a value that is inconsistent with the actual value (i.e., 1).

Hereinafter, a method of receiving/generating a media file according to an embodiment of the present disclosure will be described in detail.

Figure 13:
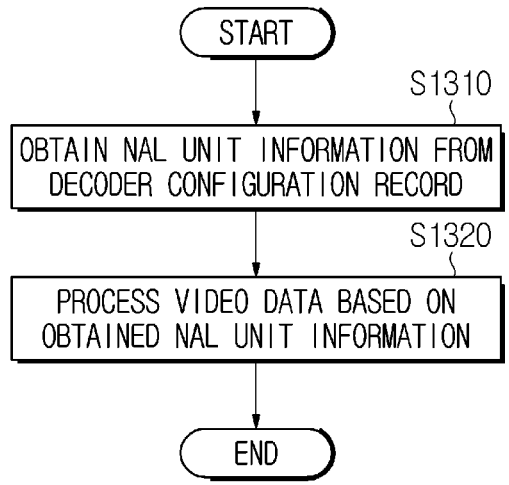
FIG. 13 is a flowchart illustrating a media file generating method according to an embodiment of the present disclosure.

FIG. 13 is a flowchart illustrating a media file receiving method according to an embodiment of the present disclosure. Each step of FIG. 13 may be performed by a media file receiving apparatus. In one example, the media file receiving apparatus may correspond to the receiving apparatus B of FIG. 1.

Referring to FIG. 13, the media file receiving apparatus may obtain network abstraction layer (NAL) unit information of video data from a decoder configuration record in a media file received from the media file generating/receiving apparatus (S1310).

The media file may have a file format such as ISO Base Media File Format (ISO BMFF), Common Media Application Format (CMAF), or the like.

The NAL unit information may include first information (e.g., numNalus) indicating the number of NAL units having the NAL unit type indicated in the decoder configuration record, for the stream to which the decoder configuration record is applied.

In one embodiment, the NAL unit information may further include second information (e.g., NAL_unit_type) indicating the indicated NAL unit type.

The media file receiving apparatus may process the video data based on the NAL unit information (S1320). Here, processing of the video data includes a process of decapsulating a media file, a process of obtaining video data from the decapsulated media file, and a process of decoding the obtained video data according to a video codec standard, for example, the VVC standard.

In one embodiment, based on the indicated NAL unit type being a predetermined non-VCL (video coding layer) NAL unit type, obtaining of the first information may be skipped.

In one embodiment, the predetermined non-VCL NAL unit type may be a Decoding Capability Information (DCI) NAL unit type or an Operating Point Information (OPI) NAL unit type.

In one embodiment, based on obtaining of the first information being skipped, the value of the first information may be determined to be 1.

In one embodiment, based on the indicated NAL unit type being a Video Parameter Set (VPS) NAL unit type and all NAL units of the indicated NAL unit type being present in a subsequent array and not present in the stream, obtaining of the first information may be skipped, and a value of the first information may be determined to be 1.

In one embodiment, based on the indicated NAL unit type being the predetermined non-VCL NAL unit type, the first information is obtained from the decoder configuration record, and the value of the first information may be limited to 1.

Figure 14:
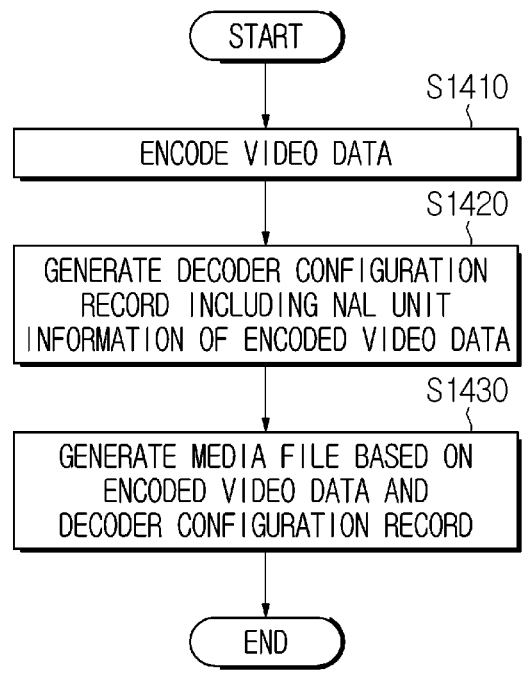
FIG. 14 is a flowchart illustrating a media file receiving method according to an embodiment of the present disclosure.

FIG. 14 is a flowchart illustrating a media file generating method according to an embodiment of the present disclosure. Each step of FIG. 14 may be performed by the media file generating apparatus. In one example, the media file generating apparatus may correspond to the transmitting apparatus A of FIG. 1.

Referring to FIG. 14, the media file generating apparatus may encode video data (S1410). In an example, the video data may be encoded through a prediction, transform, and quantization process according to a video codec standard, for example, a VVC standard.

The media file generating apparatus may generate a decoder configuration record including network abstraction layer (NAL) unit information of the encoded video data (S1420).

The NAL unit information may include first information (e.g., numNalus) indicating the number of NAL units having the NAL unit type indicated in the decoder configuration record, for the stream to which the decoder configuration record is applied.

In one embodiment, the NAL unit information may further include second information (e.g., NAL_unit_type) indicating the indicated NAL unit type.

Then, the media file generating apparatus may generate a media file based on the encoded video data and the decoder configuration record (S1430).

The media file may have a file format such as ISO Base Media File Format (ISO BMFF), Common Media Application Format (CMAF), or the like.

In one embodiment, based on the indicated NAL unit type being a predetermined non- VCL (video coding layer) NAL unit type, the first information may not be included in the decoder configuration record.

In one embodiment, the predetermined non-VCL NAL unit type may be a Decoding Capability Information (DCI) NAL unit type or an Operating Point Information (OPI) NAL unit type.

In one embodiment, based on the first information being not included in the decoder configuration record, the value of the first information may be determined to be 1.

In one embodiment, based on the indicated NAL unit type being a Video Parameter Set (VPS) NAL unit type and all NAL units of the indicated NAL unit type being present in a subsequent array and not present in the stream, the first information may not be included in the decoder configuration record, and a value of the first information may be determined to be 1.

In one embodiment, based on the indicated NAL unit type being the predetermined non-VCL NAL unit type, the first information is included in the decoder configuration record, and the value of the first information may be limited to 1.

As described above, according to an embodiment of the present disclosure, signaling of a syntax element numNalus indicating the number of NAL units may be removed for specific NAL unit types (e.g., DCI_NUT and OPI_NUT). Also, the value of the syntax element numNalus may be limited to 1 for the specific NAL unit types. Accordingly, occurrence of unnecessary information redundancy may be prevented and the file size (number of bits) may be reduced. In addition, for the specific NAL unit types, it is possible to prevent the syntax element numNalus from having a value that is inconsistent with the actual value (i.e., 1).

Figure 15:
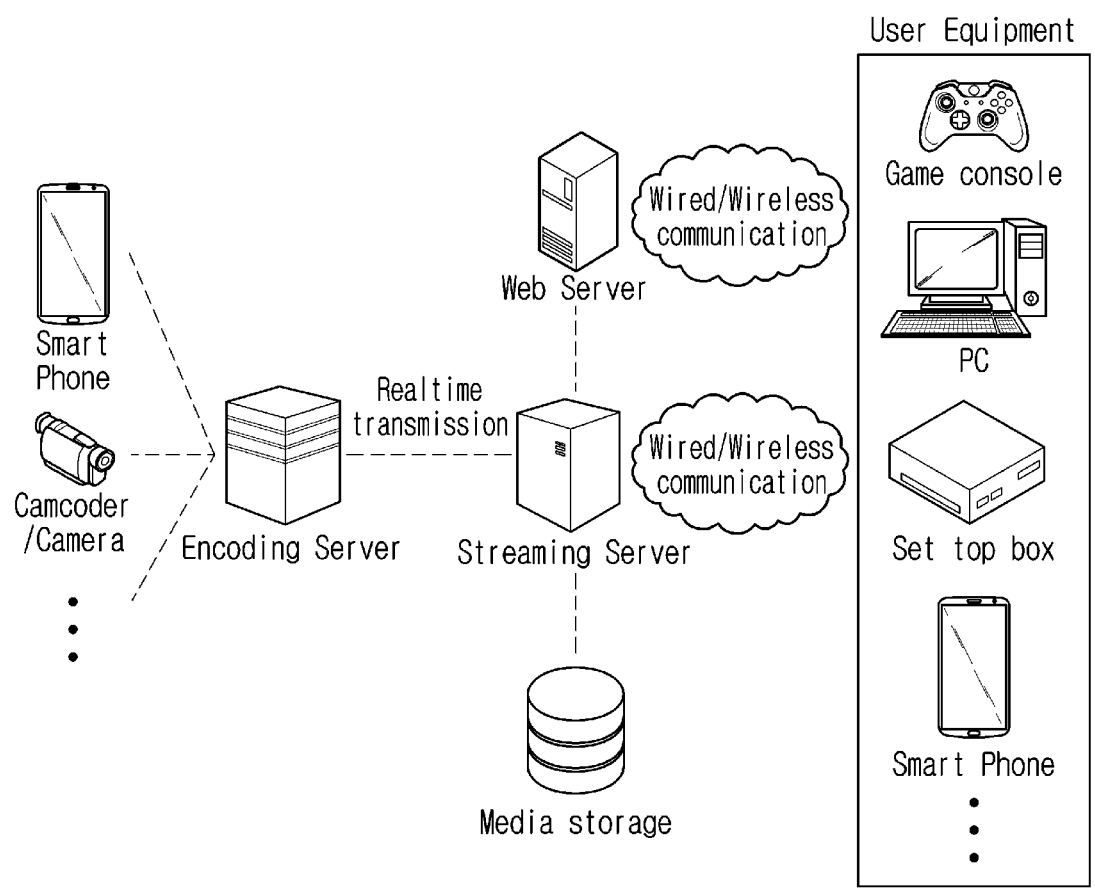
FIG. 15 is a view illustrating a content streaming system to which an embodiment of the present disclosure is applicable.

FIG. 15 is a view showing a content streaming system, to which an embodiment of the present disclosure is applicable.

As shown in FIG. 15, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

Industrial Applicability

The embodiments of the present disclosure may be used to generate and transmit/receive a media file.

What is claimed is:

1. A media file receiving method performed by a media file receiving apparatus for receiving a media file of a predetermined format, the media file including video data, the media file receiving method comprising:
   obtaining network abstraction layer (NAL) unit information of video data from a decoder configuration record in a media file; and
   processing the video data based on the NAL unit information,
   wherein the NAL unit information comprises first information specifying a number of NAL units having a NAL unit type indicated in the decoder configuration record, for a stream to which the decoder configuration record is applied, and
   wherein, based on the indicated NAL unit type being a predetermined non-video coding layer (non-VCL) NAL unit type, obtaining of the first information is skipped and a value of the first information is set to 1.

2. The media file receiving method of claim 1, wherein the predetermined non-VCL NAL unit type is a decoding capability information (DCI) NAL unit type or an operating point information (OPI) NAL unit type.

3. The media file receiving method of claim 1, wherein the NAL unit information further comprises second information specifying the indicated NAL unit type.

4. The media file receiving method of claim 1, wherein based on the indicated NAL unit type being a video parameter set (VPS) NAL unit type and all NAL units of the indicated NAL unit type being present in a subsequent array and not present in the stream, obtaining of the first information is skipped and a value of the first information is determined to be 1.

5. The media file receiving method of claim 1, wherein based on the indicated NAL unit type being the predetermined non-VCL NAL unit type, the first information is obtained from the decoder configuration record and a value of the first information is limited to 1.

6. A media file generating method performed by an apparatus for generating a media file of a predetermined format, the media file including video data, the media file generating method comprising:

encoding video data;
generating a decoder configuration record including network abstraction layer (NAL) unit information of the encoded video data; and
generating a media file based on the encoded video data and the decoder configuration record,
wherein the NAL unit information comprises first information specifying a number of NAL units having a NAL unit type indicated in the decoder configuration record, for a stream to which the decoder configuration record is applied, and
wherein, based on the indicated NAL unit type being a predetermined non-video coding layer (non-VCL) NAL unit type, the first information is not included in the decoder configuration record and a value of the first information is set to 1.

7. The media file generating method of claim 6, wherein the predetermined non-VCL NAL unit type is a decoding capability information (DCI) NAL unit type or an operating point information (OPI) NAL unit type.

8. The media file generating method of claim 6, wherein the NAL unit information further comprises second information indicating the indicated NAL unit type.

9. The media file generating method of claim 6, wherein based on the indicated NAL unit type being a video parameter set (VPS) NAL unit type and all NAL units of the indicated NAL unit type being present in a subsequent array and not present in the stream, the first information is not included in the decoder configuration record and a value of the first information is determined to be 1.

10. The media file generating method of claim 6, wherein based on the indicated NAL unit type being the predetermined non-VCL NAL unit type, the first information is included in the decoder configuration record and a value of the first information is limited to 1.

11. A method of transmitting a media file generated by the media file generating method of claim 6.

* * * * *